US008223230B2

(12) United States Patent
Chan et al.

(10) Patent No.: US 8,223,230 B2
(45) Date of Patent: Jul. 17, 2012

(54) SYSTEMS, METHODS, AND APPARATUS FOR CAMERA TUNING AND SYSTEMS, METHODS, AND APPARATUS FOR REFERENCE PATTERN GENERATION

(75) Inventors: Victor H. Chan, San Diego, CA (US); Narayana S. Ravirala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 12/775,318

(22) Filed: May 6, 2010

(65) Prior Publication Data
US 2010/0283876 A1 Nov. 11, 2010

Related U.S. Application Data

(60) Provisional application No. 61/176,731, filed on May 8, 2009.

(51) Int. Cl.
*H04N 5/208* (2006.01)
*H04N 5/232* (2006.01)
(52) U.S. Cl. ........ 348/252; 348/353; 348/177; 382/263
(58) Field of Classification Search .................. 348/177, 348/252, 353, 365, 414.1
See application file for complete search history.

(56) References Cited

U.S. PATENT DOCUMENTS

| 5,038,388 | A  | * | 8/1991  | Song ........................... 382/266 |
| 6,285,799 | B1 |   | 9/2001  | Dance et al. |
| 7,734,111 | B2 | * | 6/2010  | Toyoda et al. ................ 382/264 |
| 7,903,850 | B2 | * | 3/2011  | Rasch et al. .................. 382/128 |
| 2004/0071360 | A1 | * | 4/2004 | Maurer ........................ 382/254 |
| 2006/0045377 | A1 | * | 3/2006 | Kawai .......................... 382/274 |
| 2006/0093235 | A1 | * | 5/2006 | Takarada ..................... 382/264 |
| 2006/0245665 | A1 |   | 11/2006 | Lee et al. |

FOREIGN PATENT DOCUMENTS

| WO | WO2005096218 | 10/2005 |
| WO | WO2007141368 | 12/2007 |

OTHER PUBLICATIONS

Joshi, N. et al: "PSF estimation using sharp edge prediction" Computer Vision and Pattern Recognition, 2008. CVPR 2008. IEEE Conference on, IEEE, Piscataway, NJ, USA, Jun. 23, 2008, pp. 1-8, XP031297392 ISBN: 978-1-4244-2242-5.
International Search Report and Written Opinion—PCT/US2010/034079, International Search Authority—European Patent Office—Dec. 6, 2010.

* cited by examiner

*Primary Examiner* — Hung Lam
(74) *Attorney, Agent, or Firm* — Espartaco Diaz Hidalgo; James R. Gambale, Jr.

(57) ABSTRACT

Descriptions are provided of various implementations of an automated tuning process configured to optimize a procedure for post-processing images captured by a camera sensor.

53 Claims, 27 Drawing Sheets

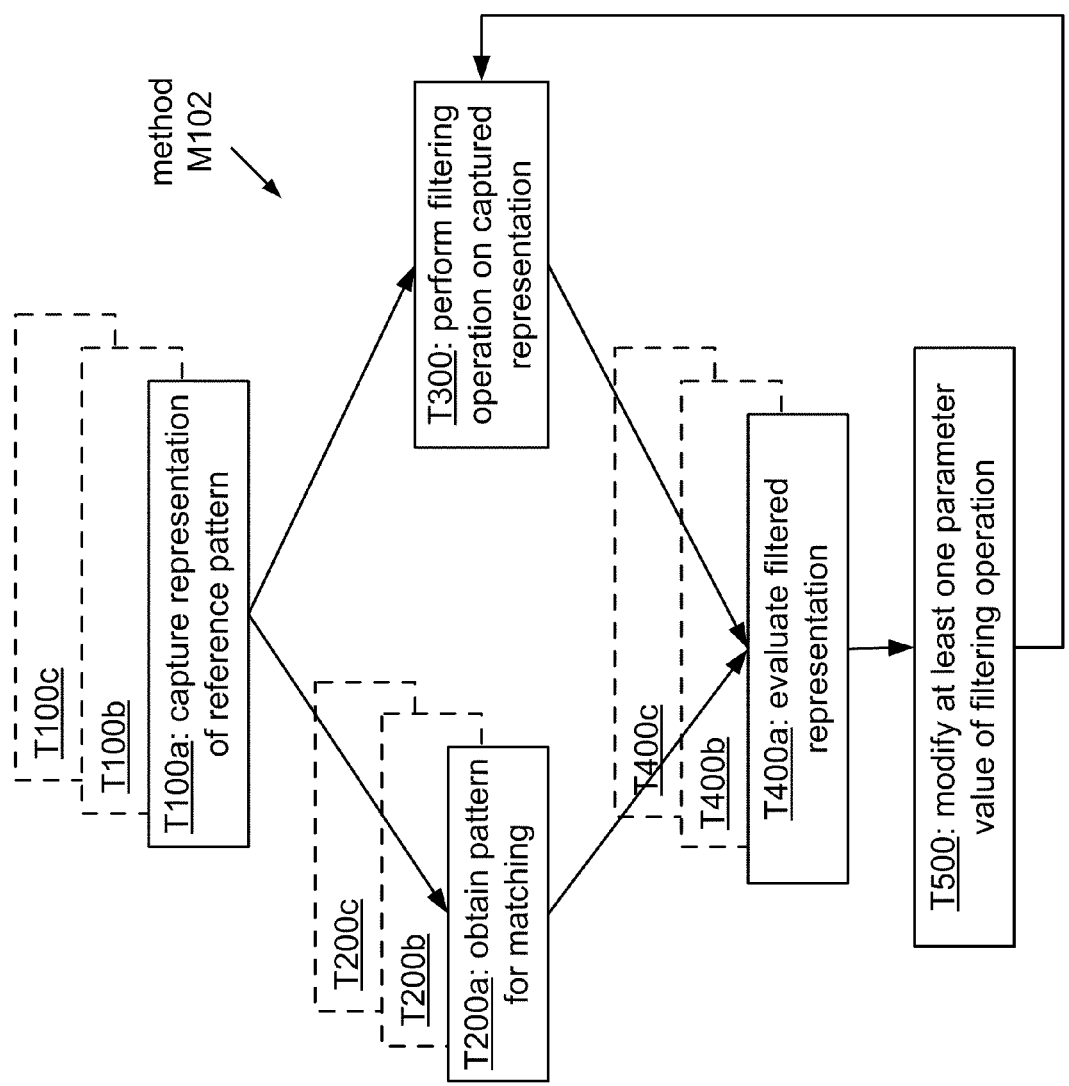

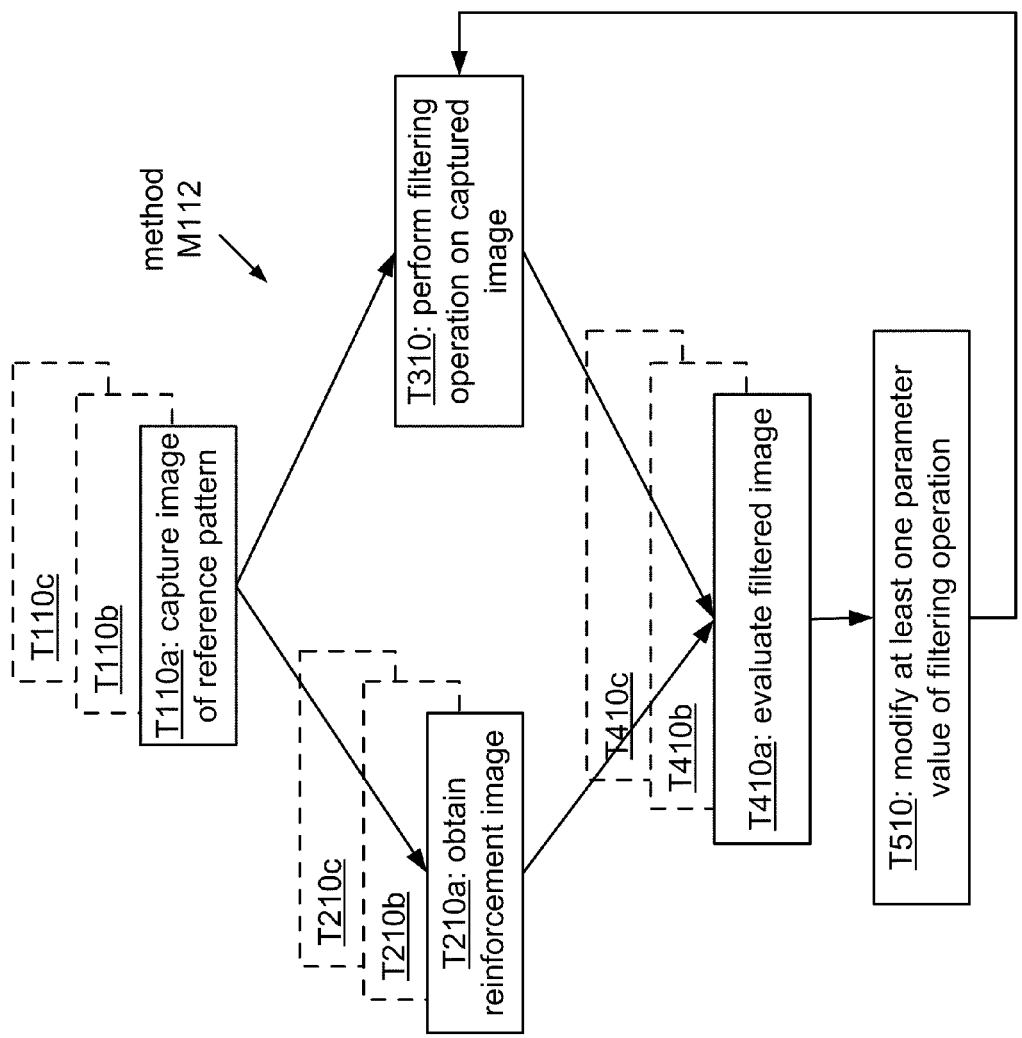

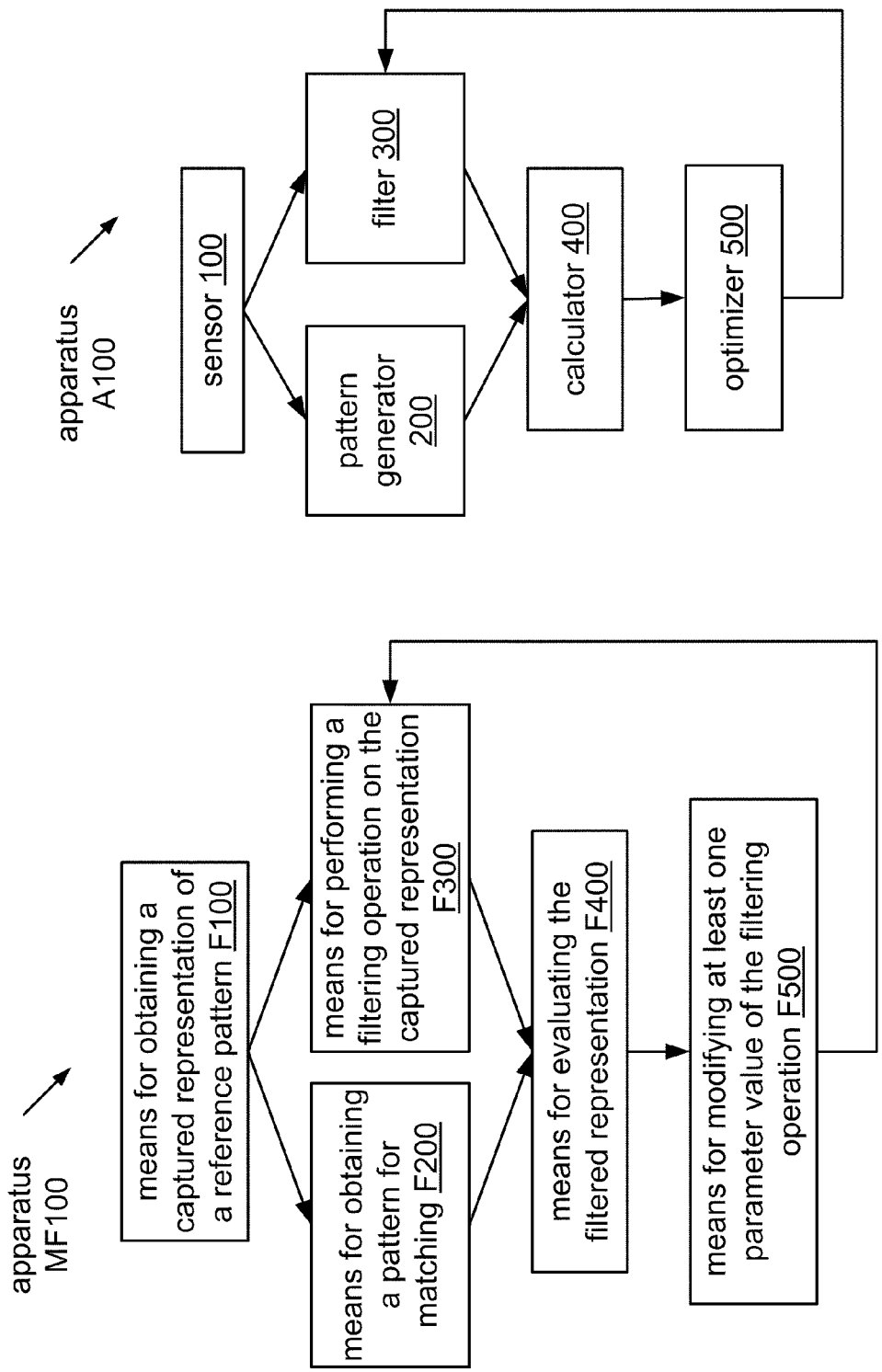

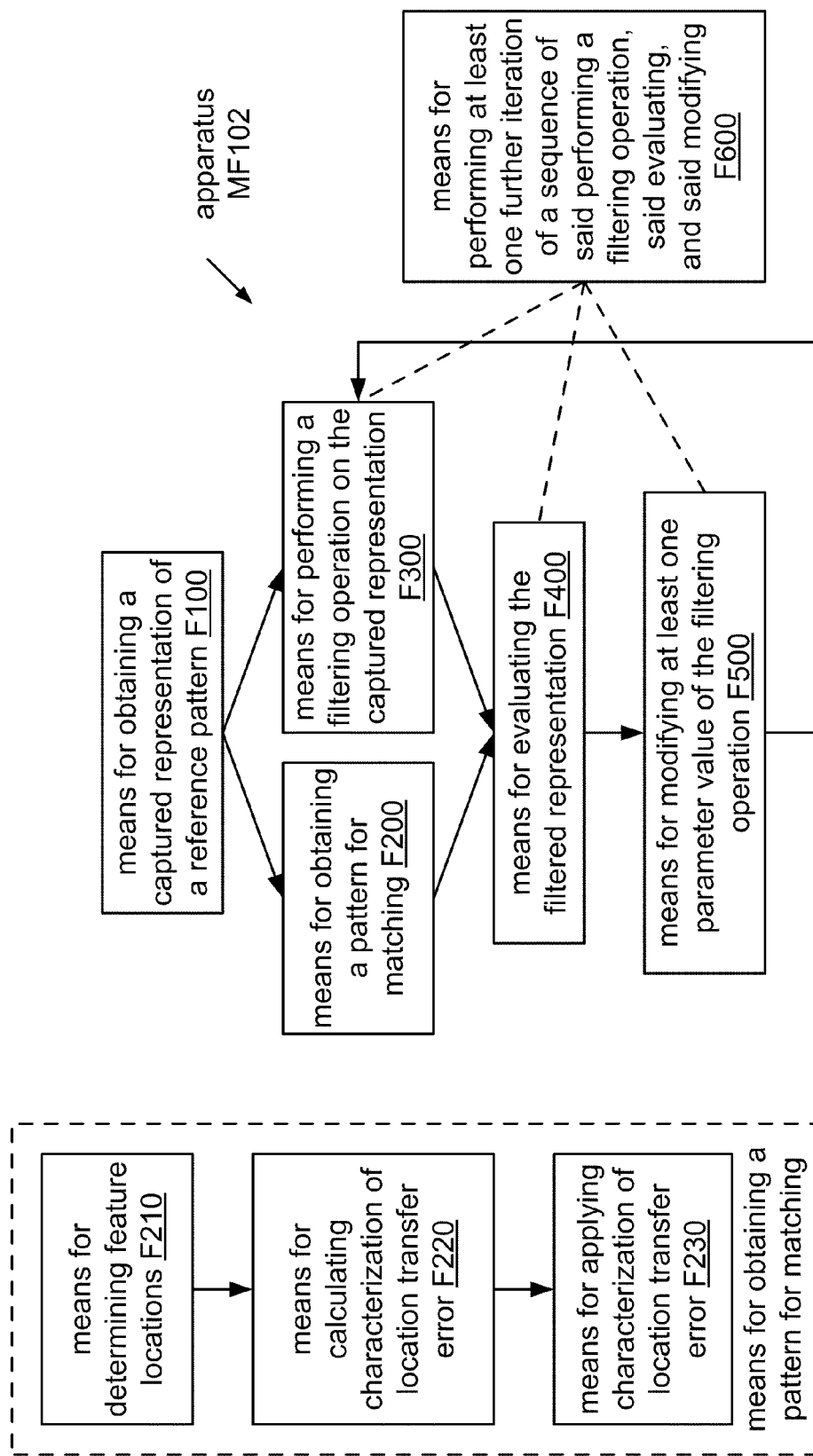

SYSTEMS, METHODS, AND APPARATUS FOR CAMERA TUNING AND SYSTEMS, METHODS, AND APPARATUS FOR REFERENCE PATTERN GENERATION

CLAIM OF PRIORITY UNDER 35 U.S.C. §119

The present Application for Patent claims priority to U.S. Provisional Pat. Appl. No. 61/176,731, entitled "SYSTEMS, METHODS, AND APPARATUS FOR GENERATION OF REINFORCEMENT SIGNAL, ARTIFACT EVALUATION, CAMERA TUNING, ECHO CANCELLATION, AND/OR REFERENCE IMAGE GENERATION," filed May 8, 2009 and assigned to the assignee hereof.

BACKGROUND

1. Field

This disclosure relates to signal processing.

2. Background

Image information captured by image capture devices, such as digital still photo cameras, may be susceptible to noise as a result of physical limitations of the image sensors, interference from illumination sources, and the like. With the increased demand for smaller image capture devices, e.g., in multi-purpose mobile devices such as mobile wireless communication devices, comes the need for more compact image sensor modules. The decrease in the size of image sensor modules typically results in a significant increase in the amount of noise captured within the image information.

Image quality may vary greatly among different model lines of cellular telephone ("cellphone") cameras and other inexpensive digital cameras. Unlike the models of a line of conventional digital cameras, different models of cellular telephones may have different optics and different sensors. Variations between high-quality optical systems of conventional cameras are typically much less than variations between the optical systems of cellphone cameras, which may be made of glass or plastic, may or may not include one or more optical coatings, and may have very different resolving powers. Similarly, the various models of a line of conventional digital cameras typically have the same sensor, possibly in different sizes, while cellphone cameras of the same line or even the same model may have very different sensors. As a result, images from different models of cellphone cameras will typically be much more different from one another than images from different models of conventional cameras.

In order to produce commercially acceptable image quality from a cellphone camera or other inexpensive digital camera, it may be desirable to perform a filtering operation (also called a "post-processing procedure") on the captured image. Such an operation may be designed to enhance image quality by, for example, reducing artifacts and/or increasing edge sharpness. The process of determining an appropriate post-processing procedure for a particular camera is also called "camera tuning." Typically, camera tuning is repeated whenever a new lens and/or sensor is used.

SUMMARY

A method according to a general configuration includes obtaining a captured representation of a reference pattern and, based on the captured representation, obtaining a pattern for matching. This method also includes performing a filtering operation that is based on a set of values for the plurality of filter parameters, including performing said filtering operation on the captured representation to produce a filtered representation. This method also includes evaluating at least one difference between the filtered representation and the pattern for matching and, based on a result of said evaluating, modifying at least one among the set of values. This method also includes performing at least one further iteration of a sequence of said performing a filtering operation, said evaluating, and said modifying such that (1) said set of values in each further iteration of said performing a filtering operation is the set of values as modified in the previous iteration of the sequence, and (2) said filtered representation in each iteration of said evaluating is the filtered representation produced in the current iteration of the sequence, and (3) said result in each iteration of said modifying is the result of said evaluating in the current iteration of the sequence. Apparatus and other means for performing such a method, and computer-readable media having executable instructions for such a method, are also disclosed herein.

A method according to another general configuration includes, for each of a plurality of reference patterns, capturing an image of the reference pattern and, for each of the plurality of captured images, performing a filtering operation on the captured image to obtain a filtered image. This method also includes, for each of the plurality of filtered images, evaluating a quality of the image and, based on the plurality of evaluated qualities, modifying the filtering operation. In this method, at least one among the plurality of reference patterns includes a plurality of regions of substantially uniform intensity that meet to form a plurality of high-contrast edges and, for each of the plurality of high-contrast edges, an intensity difference across the edge is at least equal to a first value. In this method, at least one among the plurality of reference patterns includes a plurality of regions of substantially uniform intensity that meet to form a plurality of low-contrast edges and, for each of the plurality of low-contrast edges, an intensity difference across the edge is not greater than seventy-five percent of the first value. In this method, in at least one among the plurality of the captured images, among a plurality of edges that correspond to the plurality of low-contrast edges, adjacent edges are separated by at least eight pixels. Apparatus and other means for performing such a method, and computer-readable media having executable instructions for such a method, are also disclosed herein.

BRIEF DESCRIPTION OF THE DRAWINGS

FIG. 2 shows a flowchart of an implementation M102 of method M100.

FIG. 3 shows a flowchart of an implementation M112 of methods M100 and M102.

FIG. 24 shows a block diagram of an apparatus MF100 according to a general configuration.

FIG. 25A shows a block diagram of an implementation F202 of means F200.

FIG. 25B shows a block diagram of an implementation MF102 of apparatus MF100.

DETAILED DESCRIPTION

Figure 1B:
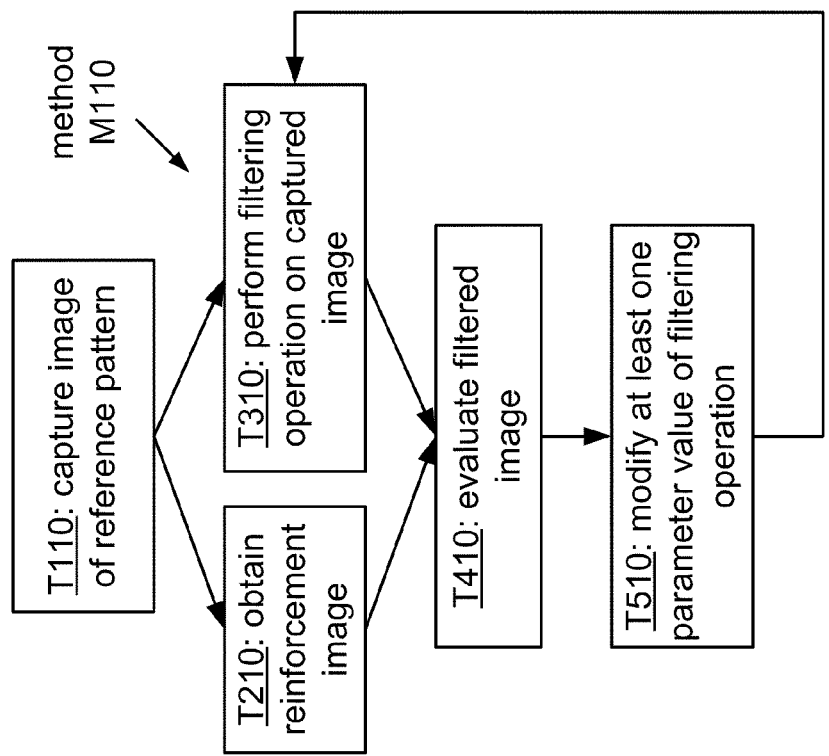
FIG. 1B shows a flowchart of an implementation M110 of method M100.

Camera tuning is typically time-consuming, expensive, and subjective. Traditionally, camera tuning is performed by engineers having advanced training in color science. Because a large number of parameters may be involved in the camera tuning process, the parametric space of the problem may be extremely high. Finding a near-optimal solution (e.g., a set of filter parameters that increases a desired quality metric without also creating artifacts) is a nontrivial problem and may take days or weeks. It may also be necessary to repeat the camera tuning process if the result produced by the tuning engineer does not match the subjective preference of her customer (e.g., the camera manufacturer). It may be desirable to automate a camera tuning process, to reduce the learning curve of such a process, and/or to render the result of such a process more quantifiable or less subjective.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

FIG. 1 shows a flowchart of a method M100 according to a general configuration that includes tasks T100, T200, T300, T400, and T500. Task T100 performs a capturing operation to capture a representation of a reference pattern. Based on the captured representation, task T200 obtains a pattern for matching. Task T300 performs a filtering operation to be tuned on the captured representation. Task T400 evaluates the filtered representation, and task T500 modifies at least one parameter value of the filtering operation based on a result of the evaluation. It may be desirable to implement method M100 as an automated tuning process that optimizes the at least one parameter value by iterating tasks T300, T400, and T500 until task T400 produces a desired evaluation result and/or until a maximum number of iterations has been performed.

In one example, method M100 is configured to optimize a filtering operation (or "post-processing procedure") to be applied to a luminance channel of images captured by a camera sensor. Such a tuning process may be based on criteria such as noise, edge sharpness, and oversharpening artifacts. The tuning process may include selecting values of parameters that may oppose each other and whose combined effects on image quality are not known a priori. In other examples of imaging applications, method M100 is configured to optimize and/or automate tuning of one or more color channels. More generally, method M100 may be applied to optimize and/or automate processing of non-imaging signals, such as echo cancellation processing of an audio signal, or to optimize and/or automate other high-parametric-space problems.

FIG. 1B shows a flowchart of an implementation M110 of method M100 as an automated camera tuning process. Method M110 includes implementations T110, T210, T310, T400, and T510 of tasks T100, T200, T300, T400, and T500, respectively. Task T110 uses an instance of a camera to be tuned to capture an image of a reference pattern. Based on the captured image, task T210 obtains a reinforcement pattern. Task T310 performs a post-processing procedure to be tuned on the captured image. Task T410 evaluates the post-processed image, and task T510 modifies at least one parameter value of the post-processing procedure. It may be desirable to configure method M110 to tune the post-processing procedure to compensate for effects of noise from sources that may include the camera sensor, the camera optical system (e.g., lens), and even the post-processing procedure itself. The resulting optimized parameter value or values may be loaded into other instances of the tuned camera (e.g., other instances having the same sensor and lens, such as other cameras of the same model) during production, such as by copying the values into flash memory or other nonvolatile memory of each camera.

Method M100 may be implemented as a reinforcement learning process. In an imaging application of such a process, the camera to be tuned is used to capture an image of a reference pattern, the post-processing procedure is used to process the captured image to obtain a processed (or "filtered") image, and the values of one or more parameters of the post-processing procedure are adjusted until the captured image is sufficiently close to a reinforcement pattern (or until a maximum number of iterations is reached). The nature and quality of the reinforcement pattern may have a significant effect on the performance of the automated camera tuning process. If a flawed reinforcement pattern is used, the automated camera tuning process may produce a suboptimal result.

One example of such a tuning process uses a set of reference patterns that are designed to quantify different aspects of the post-processing procedure that is to be tuned. In an imaging application, for example, it may be desirable to use a set of reference patterns that abstractly represents a range of image features that are common, ubiquitous, and/or perceptually important in real-life images. It may be desirable to use a sufficient number of different reference patterns to cover the particular parametric space. It may also be desirable to have complete a priori knowledge of the contents of each reference pattern. For example, complete a priori knowledge of the reference pattern may be used to construct a pattern for matching as described herein.

FIG. 2 shows a flowchart of an implementation M102 of method M100 that includes multiple corresponding instances T100a,b,c of capturing task T100; T200a,b,c of pattern generating task T200; and T400a,b,c of evaluating task T400. In this case, each instance of task T100 is configured to capture a representation of a different reference pattern, and task T300 is configured to perform the same filtering operation (according to an initial set of parameter values) on each captured representation to produce a corresponding filtered representation. Each instance of task T200 is configured to obtain a pattern for matching based on information from the corresponding reference pattern and captured representation, and each instance of task T400 is configured to evaluate the corresponding filtered representation. In this method, task T500 is configured to use information from the various instances of task T400 to modify the filter parameter values, and the next iteration of task T300 is configured to perform the same filtering operation (according to the modified set of parameter values) on each captured representation to produce the next set of filtered representations. FIG. 3 shows a flowchart of a corresponding implementation M112 of methods M102 and M110. In a further example, multiple instances of method M112 are implemented for different respective illuminations.

It may be desirable for a set of reference patterns to include at least one pixel noise quantification pattern, at least one edge sharpness quantification pattern, and at least one oversharpening artifact quantification pattern. FIGS. 4 to 11 show one example of such a set of eight monochrome reference patterns.

Figure 4:
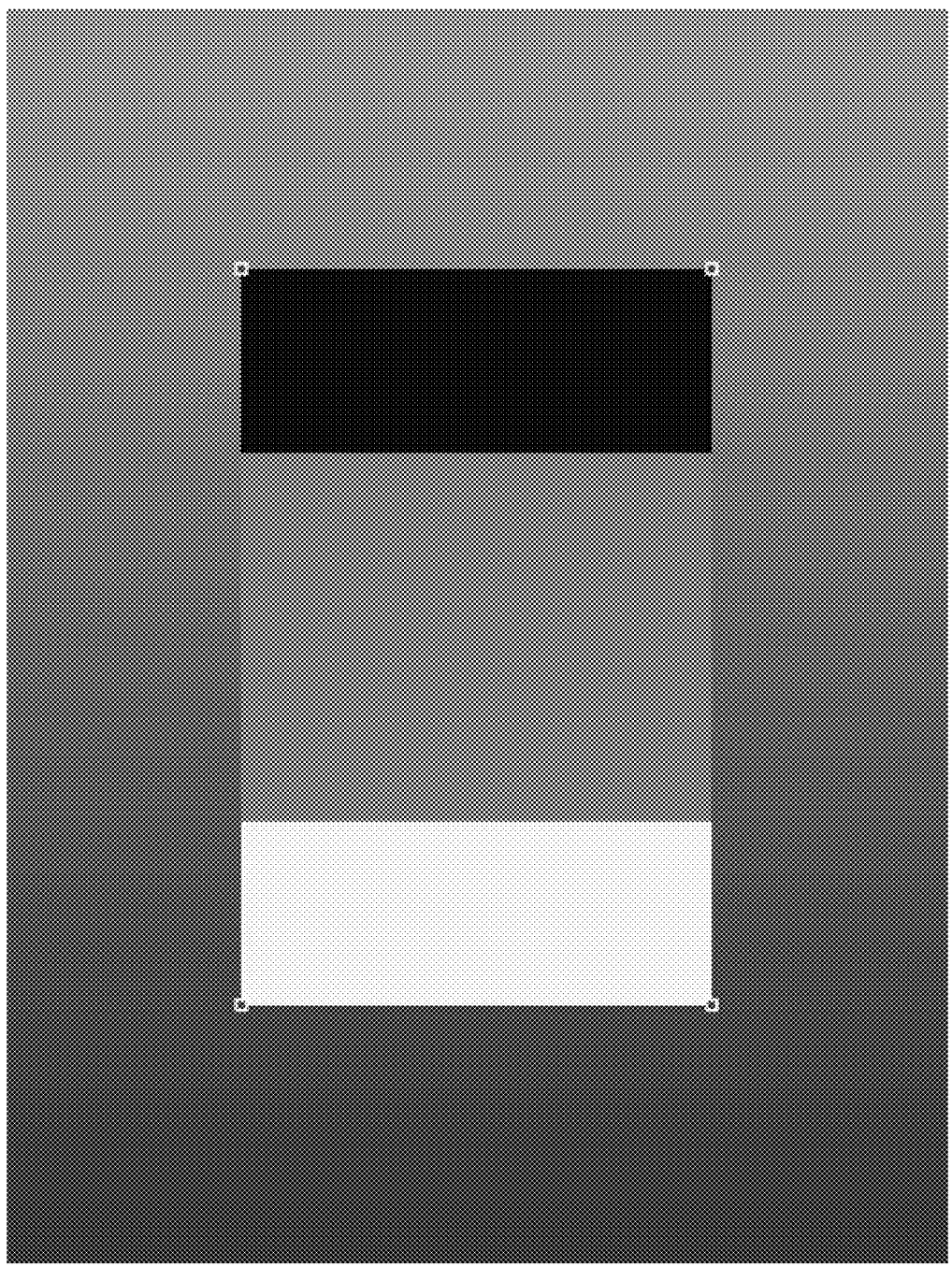
FIG. 4 shows an example of a noise quantification pattern.

A pixel noise quantification pattern provides information that may be used to quantify noise of the camera sensor (e.g., pattern noise). Such a pattern may be configured to include one or more regions that have a low pixel-to-pixel variance (e.g., to reduce sources of pixel-to-pixel response differences other than sensor noise). For example, such a pattern may include one or more flat-field regions. One such example is a pattern as shown in FIG. 4, which includes three flat-field regions: a highly saturated patch (e.g., maximum intensity, or a normalized luminance at or near 1.0) to characterize noise in highlight areas; a midtone patch (e.g., a normalized luminance at or near 0.5) to characterize noise in midtone areas; and a highly unsaturated patch (e.g., minimum intensity, or a normalized luminance at or near 0.0) to characterize noise in shadow areas. Such a pattern may also include one or more gradient areas, as shown in the background of the pattern of FIG. 4. It may be expected that the camera's imaging sensor and associated circuitry will be the primary source of pixel noise.

Figure 5:
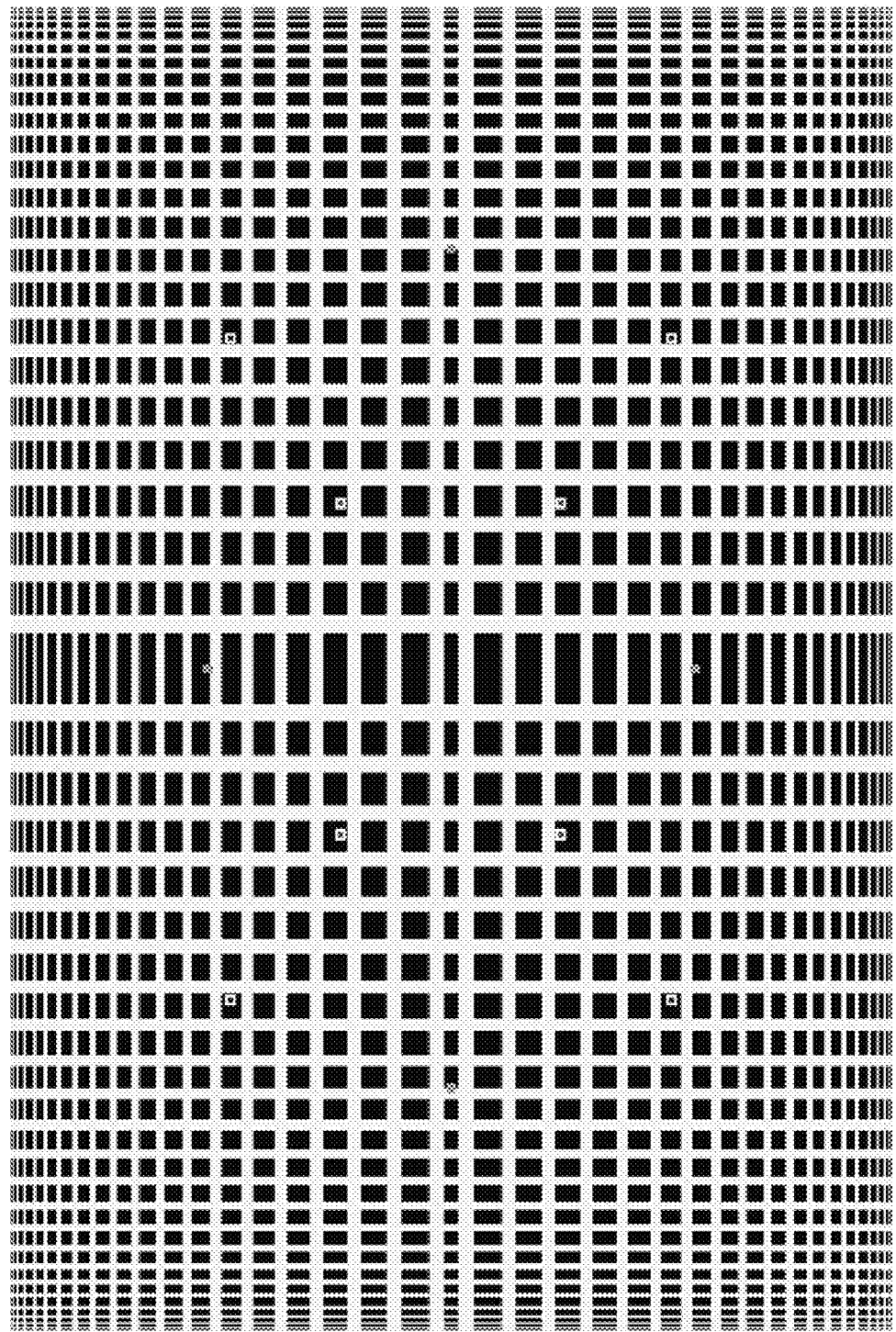
FIG. 5 shows an example of an edge sharpness quantification pattern that contains horizontal and vertical edges.
Figure 6:
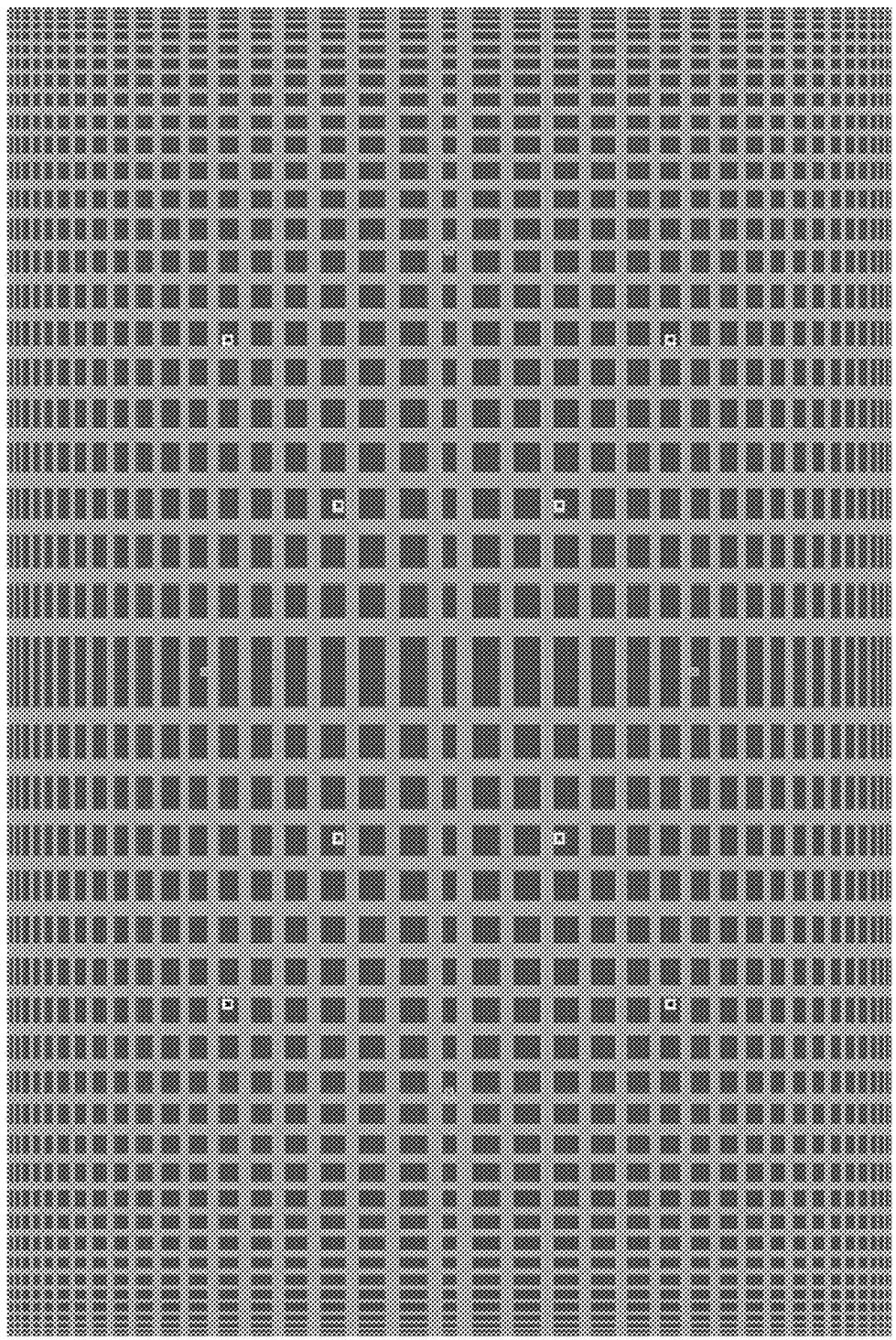
FIG. 6 shows an example of a low-contrast version of the pattern shown in FIG. 5.
Figure 7:
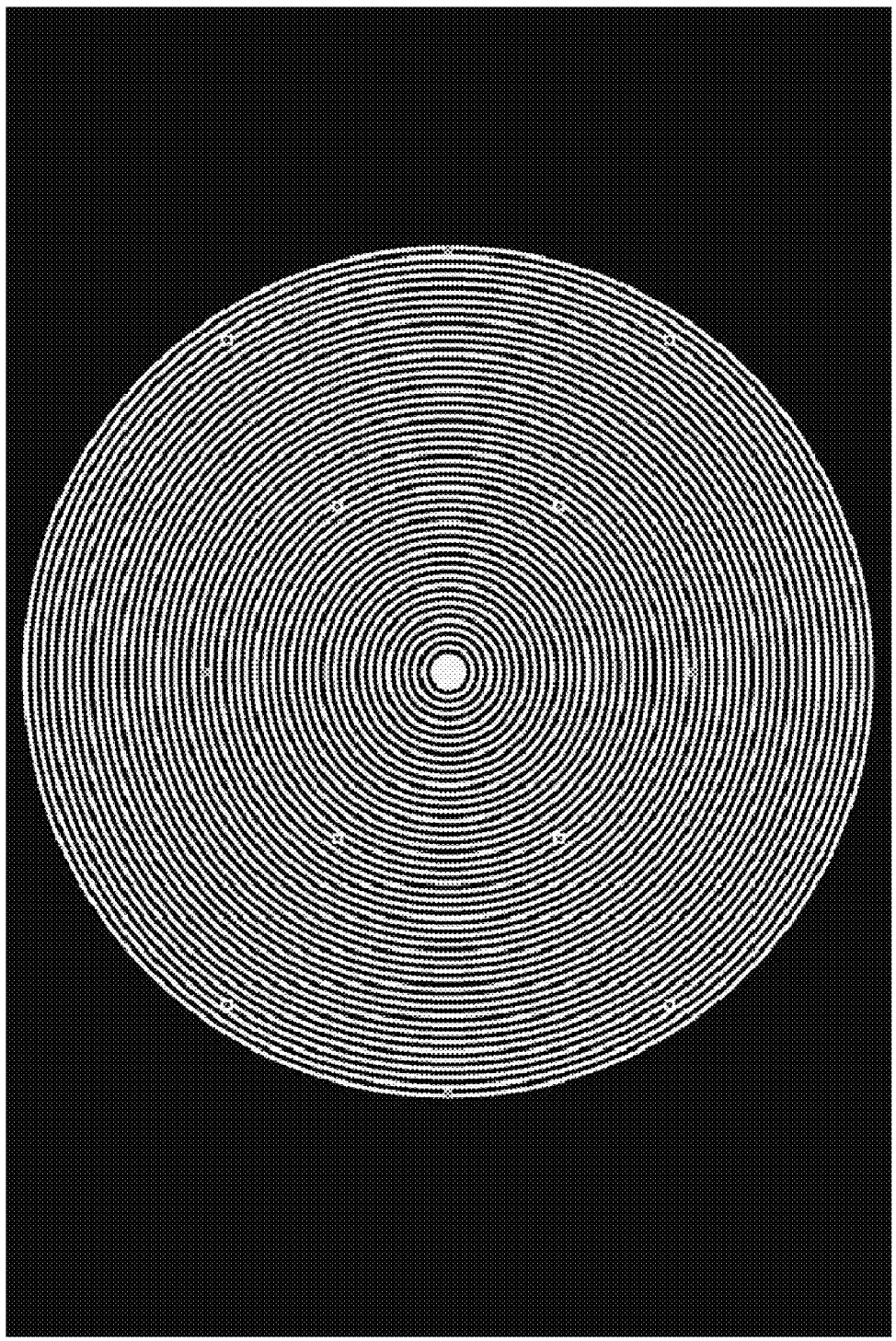
FIG. 7 shows an example of an edge sharpness quantification pattern that contains circular edges.
Figure 9:
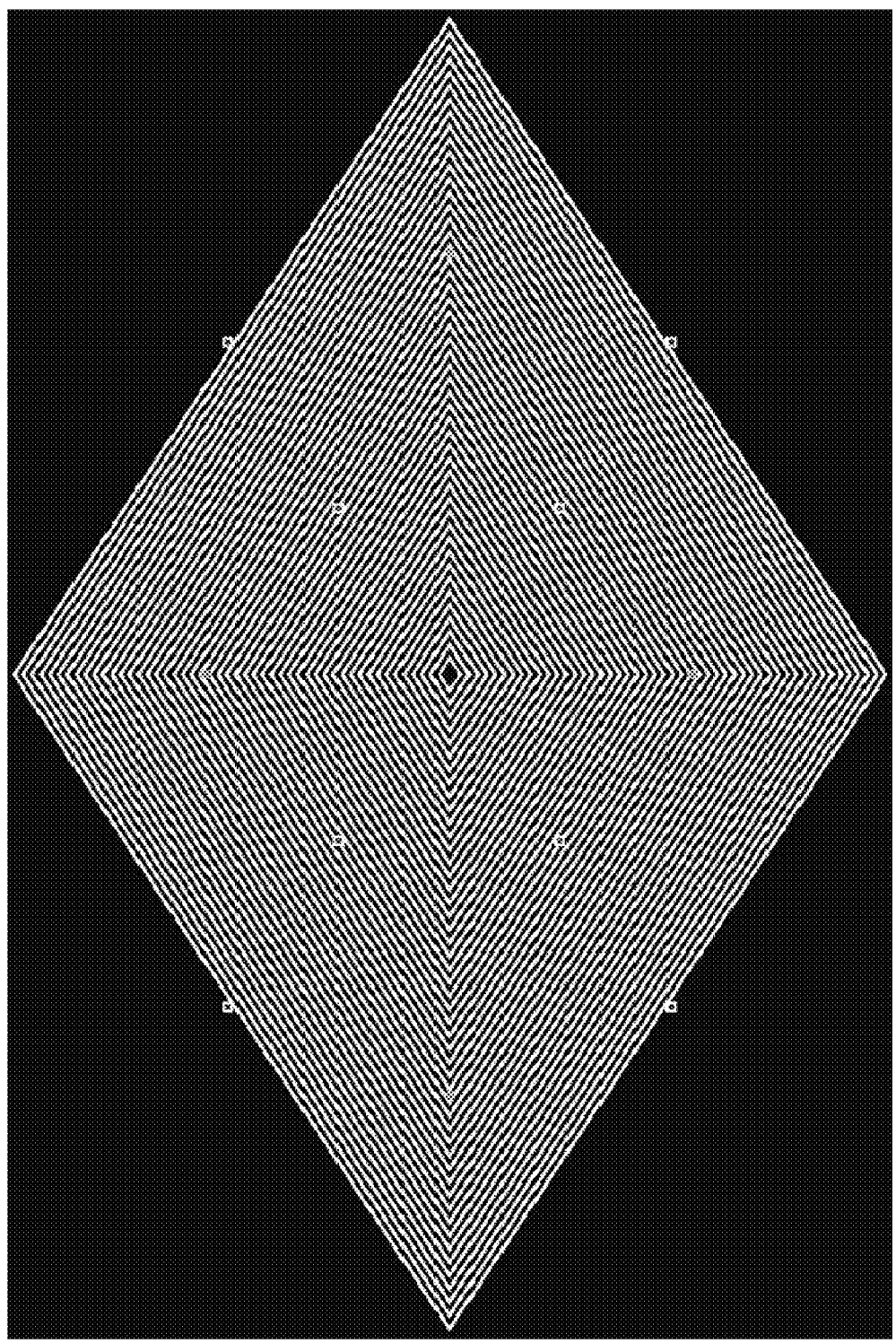
FIG. 9 shows an example of an edge sharpness quantification pattern that contains slanted edges.

It may be desirable for an edge sharpness quantification pattern, or a set of such patterns, to include a range of edges of different orientations and/or shapes. For example, a set of edge sharpness quantification patterns may be selected to provide a desired sampling of the range of spatial frequency features expected to be encountered during use of the camera. One example of such a set includes a pattern that contains horizontal and vertical edges (e.g., as shown in FIG. 5), a pattern that contains circular edges (including edges having one, two, or more different radii of curvature relative to one another, e.g., as shown in FIG. 7), and a pattern that contains slanted edges (including edges having orientations such as plus forty-five degrees and minus forty-five degrees from the vertical, or plus and minus fifty-three degrees from the vertical as shown in FIG. 9). Another example of an edge sharpness quantification pattern having slanted lines includes lines that radiate away from the center of the pattern at different angles. It may be expected that the camera lens will be the primary source of image blur.

Figure 10:
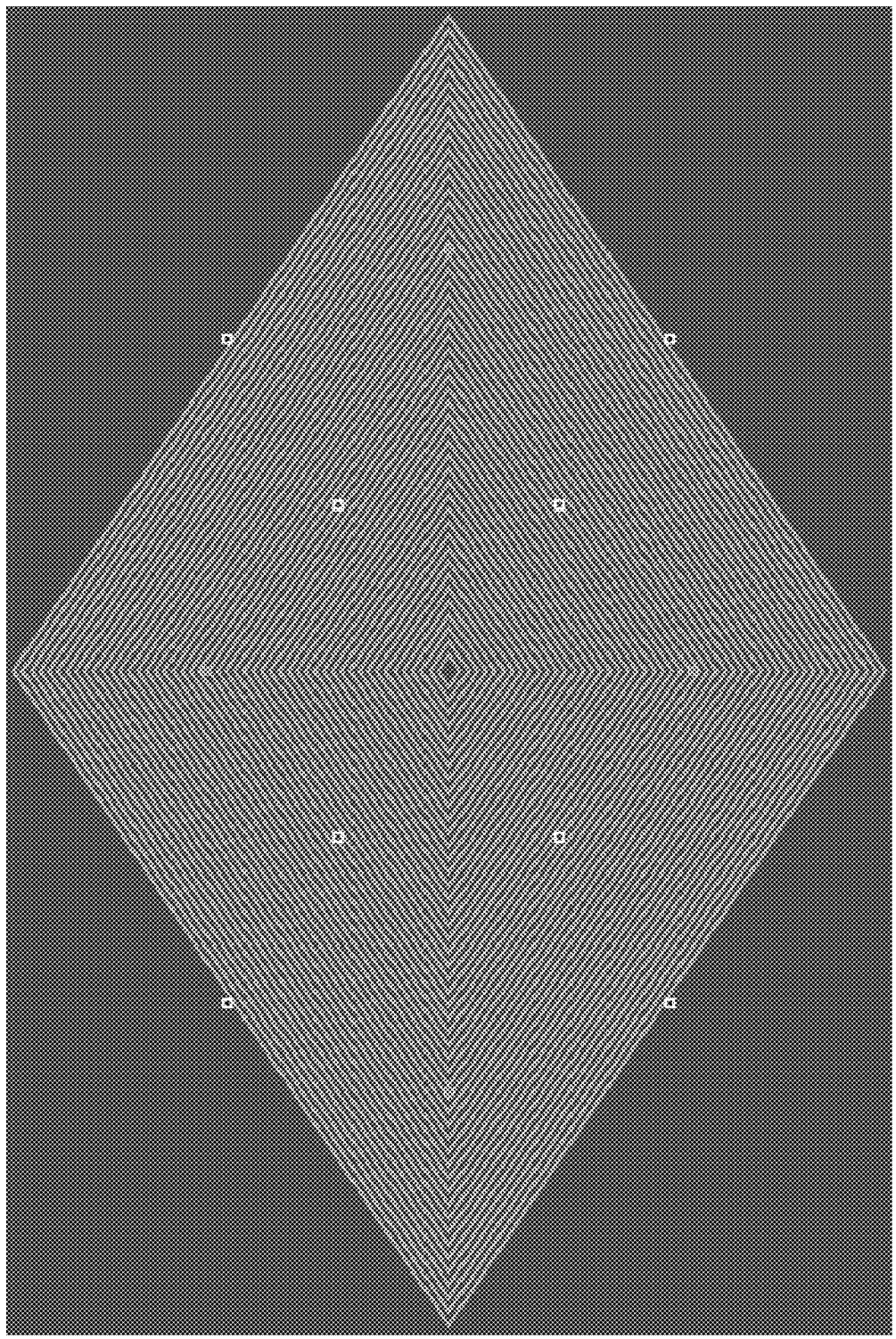
FIG. 10 shows an example of a low-contrast version of the pattern shown in FIG. 9.
Figure 11:
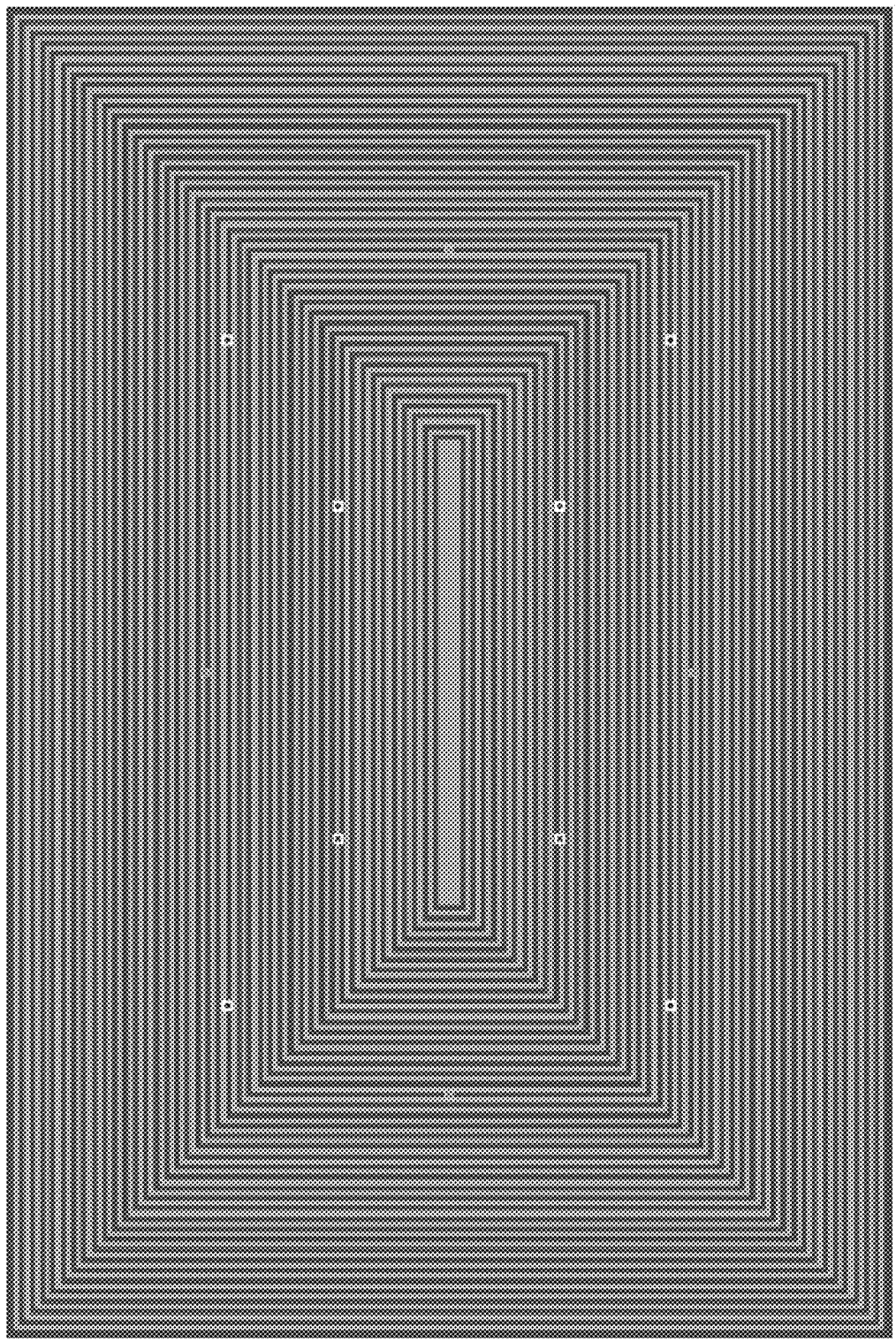
FIG. 11 shows an example of an oversharpening artifact quantification pattern.

It may be desirable for the edges of an edge sharpness quantification pattern to form concentric figures (e.g., as shown in FIGS. 7-10, and also in FIG. 11). It may be desirable for the set of edge sharpness quantification patterns to include edges in two orthogonal directions and edges in a third direction that differs from each of the orthogonal directions by at least twenty-five or thirty degrees (e.g., as shown in FIGS. 5, 6, 9, and 10). While different edge features (e.g., orthogonal and slanted edges, straight and curved edges) may be combined into different areas of the same pattern, such consolidation may lead to a reduction in the accuracy of the tuning process (e.g., corrections to local aberrations being applied globally), and it may be desirable to use different patterns for different features.

It may be desirable for each one or more (possibly all) of the edge sharpness quantification patterns to be bimodal. For example, such a feature may simplify a global process of distinguishing the sides of each edge that is to be analyzed. Such a pattern may include regions of substantially uniform low intensity that meet regions of substantially uniform high intensity to form edges. The term "substantially uniform" indicates uniformity within five, two or one percent.

Alternatively or additionally, it may be desirable for such a set to include high-contrast and low-contrast versions of one or more patterns (e.g., as shown in FIGS. 5-10). For high-contrast edges, it may be desirable for the regions that meet to form the edge to be as highly saturated and unsaturated, respectively, as possible. It may be desirable for the intensity transition at a low-contrast edge to be not greater than seventy-five percent of the intensity transition at a high-contrast edge. For low-contrast edges, for example, it may be desirable for the regions that meet to form the edge to have intensities that are within the middle half of the available intensity range (e.g., at least 0.25 and not more than 0.75 in a normalized range of 0.0 to 1.0). Alternatively or additionally, it may be desirable for one or more of such patterns to include edges having at least two different contrasts. Such a pattern may include a sudden transition between areas of high and low contrast (e.g., a high-contrast half and a low-contrast half) and/or a gradual transition from an area of high contrast to an area of low contrast.

It may be desirable for one or more of the edge sharpness quantification patterns to include edges that have the same fundamental spatial frequency (e.g., such that the minimum number of bright pixels between each respective pair of edges is the same as the minimum number of dark pixels between each respective pair of edges). Alternatively or additionally, it may be desirable for one or more of the edge sharpness quantification patterns to include two or more different fundamental spatial frequencies (e.g., such that a spatial distance between one pair of adjacent edge transitions is different than a spatial distance between another pair of adjacent edge transitions). It may be desirable to design the patterns in consideration of the particular capturing arrangement to be used, such that the distance between edges in the captured representations will be at least a minimum value (e.g., eight, ten, sixteen, or twenty pixels).

Figure 12A:
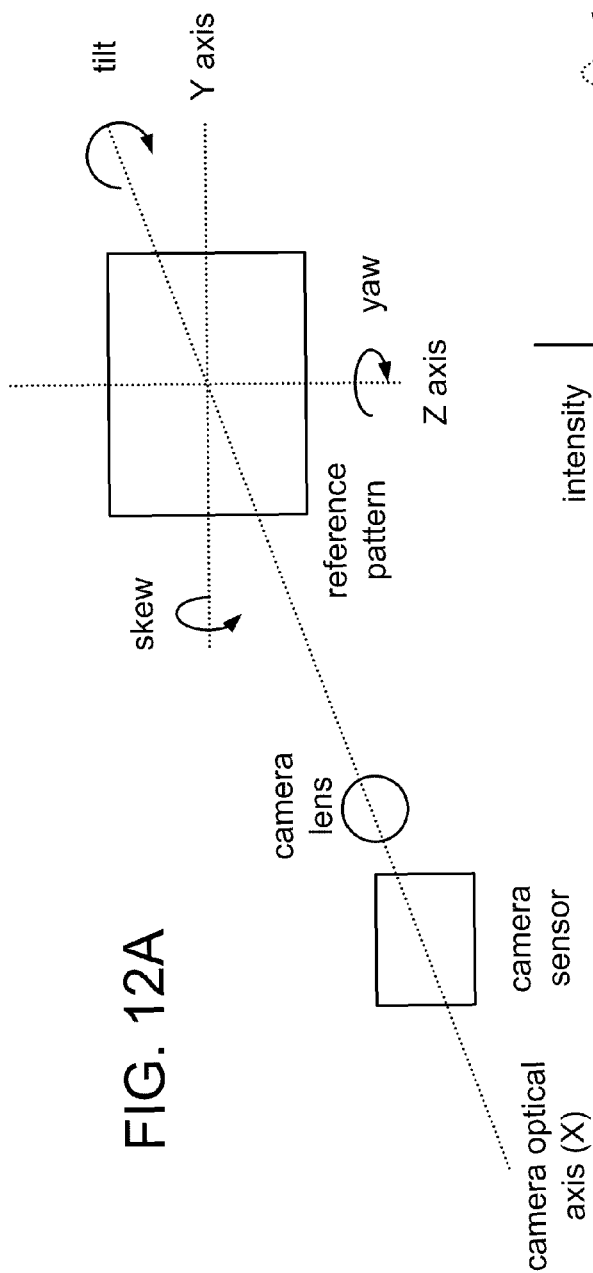
FIG. 12A illustrates relative positioning of a camera sensor and a reference pattern.
Figure 12B:
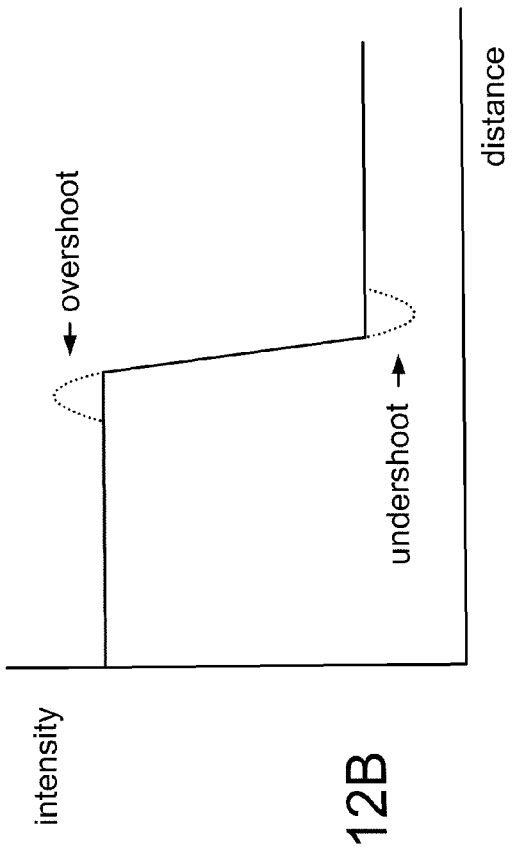
FIG. 12B shows an example of overshoot and undershoot at an edge.
Figure 13:
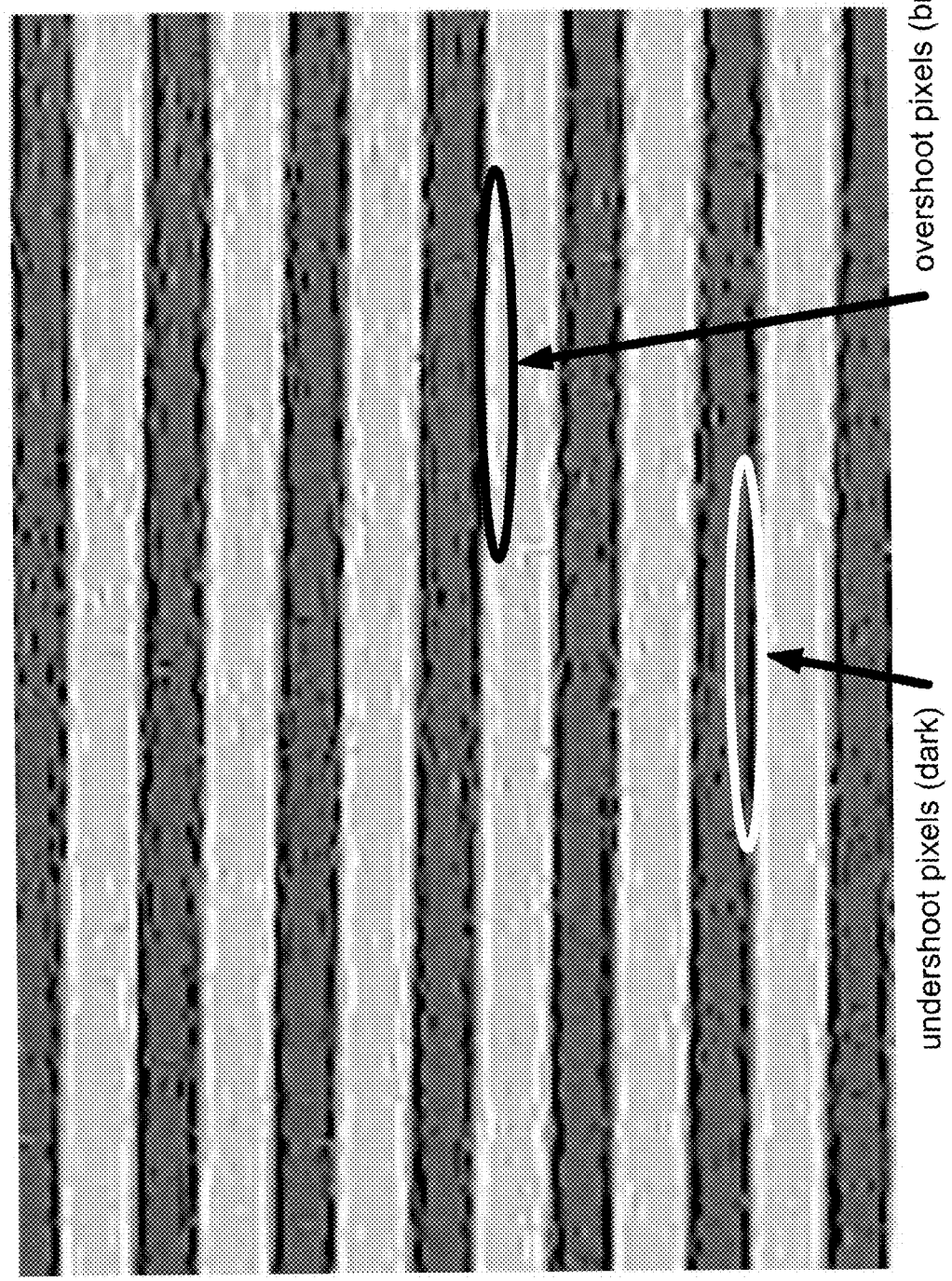
FIG. 13 shows an example of an oversharpened region.

An oversharpening artifact quantification pattern (e.g., as shown in FIG. 11) provides information that may be used to quantify artifacts caused by an edge sharpening operation of the post-processing procedure. As shown in FIG. 12B, such artifacts may appear as overshoots (i.e., overly bright pixels near a transition from a dark region) or undershoots (i.e., overly dark pixels near a transition from a bright region). FIG. 13 shows an example of a region of the oversharpening artifact quantification pattern in FIG. 11 after oversharpening, in which overshoot and undershoot pixels are visible along the edges. It may be expected that the post-processing procedure will be the primary source of oversharpening artifacts.

One example of an oversharpening artifact quantification pattern (e.g., as shown in FIG. 11) includes edges whose contrast and fundamental spatial frequency are selected to promote detectability and quantifiability of oversharpening artifacts in the captured image. It may be desirable for the reference pattern to have a minimum spacing between adjacent edges such that artifacts associated with adjacent edges do not overlap or otherwise interfere with each other and may be readily distinguished from one another. This minimum spacing may be based on such factors as the artifact creation behavior of the sharpening algorithm, the resolving power (e.g., the modulation transfer function) of the camera optical system, and the expected distance of the camera from the reference pattern during capture. For example, it may be desirable for the captured image to have a minimum number of pixels (e.g., eight, ten, sixteen, or twenty pixels) between adjacent edges. As shown in FIG. 11, for example, the pattern may include parallel stripes of alternating brightnesses that have at least a minimum width. It may be desirable for each of one or more (possibly all) of the oversharpening artifact quantification patterns to be bimodal (as in the example of FIG. 11).

Figure 8:
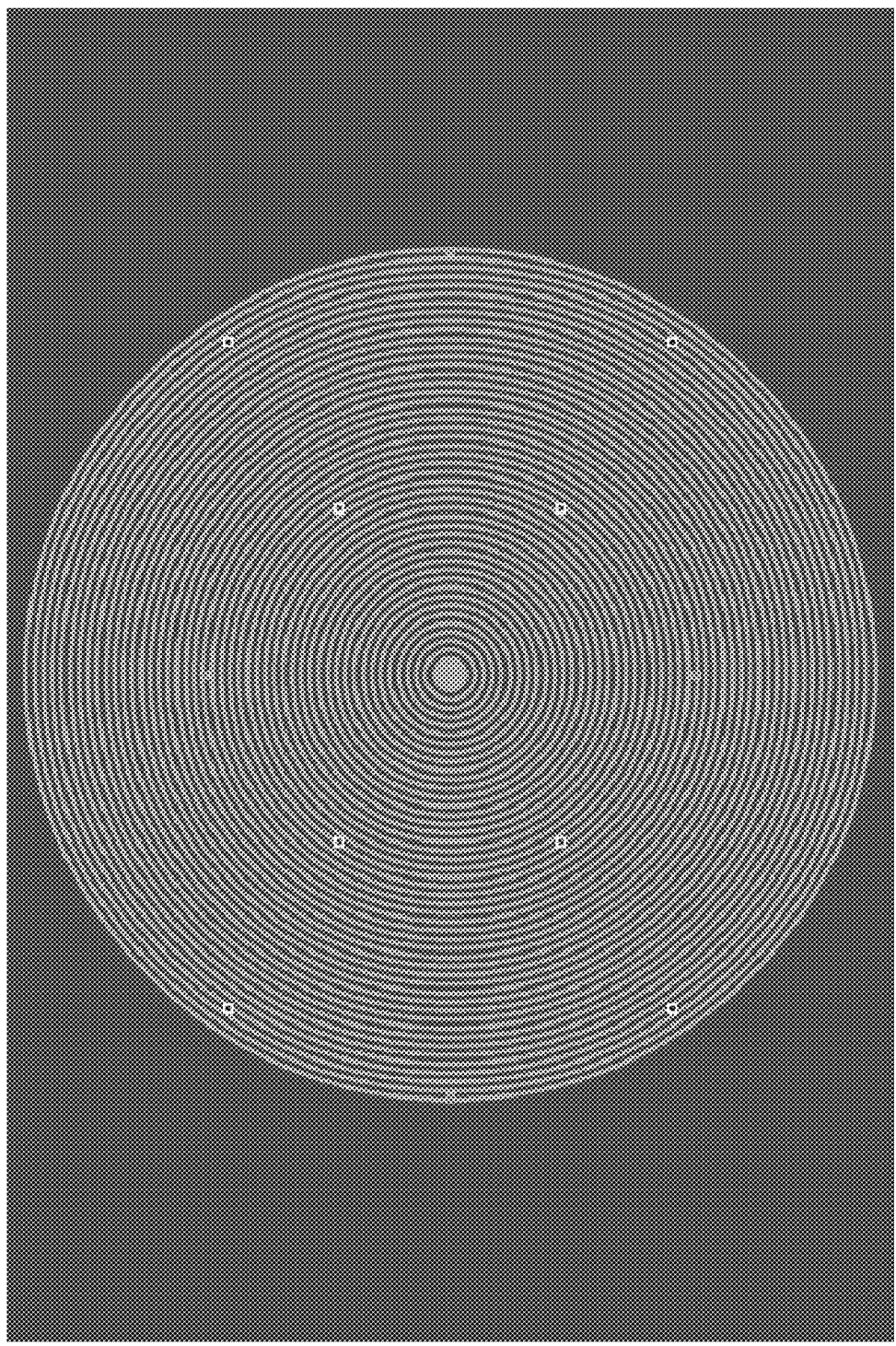
FIG. 8 shows an example of a low-contrast version of the pattern shown in FIG. 7.

Oversharpening artifacts may occur on curved edges as well as straight edges, and the set of reference patterns may include an oversharpening artifact quantification pattern with curved edges (e.g., as shown in FIG. 8) and/or slanted edges (e.g., as shown in FIG. 10). A sharpening kernel with top/bottom and left/right symmetry (e.g., a 5×5 kernel such as $\frac{1}{6}*[-1\ -2\ 6\ -2\ -1;\ -1\ -2\ 6\ -2\ -1;\ -1\ -2\ 6\ -2\ -1;\ -1\ -2\ 6\ -2\ -1;\ -1\ -2\ 6\ -2\ -1]$), for example, may be prone to generating oversharpening artifacts on curved edges, and it may be desirable to account for such artifacts in the camera tuning process.

It may be desirable for the edges of an oversharpening artifact quantification pattern to have sufficient contrast to support the generation of oversharpening artifacts. If the edges in the pattern do not have sufficient contrast, they may fail to adequately represent edges in an image captured during a typical use of the camera, and the sharpening operation may fail to generate artifacts. On a normalized intensity scale of zero to one, for example, where zero indicates minimum intensity (e.g., zero luminance or reflectivity) and one indicates maximum intensity (e.g., full saturation or reflectivity), it may be desirable for the difference between the bright and dark sides of an edge to have a value in the range of from 0.2 to 0.6 (e.g., 0.4).

However, it may also be desirable for the dynamic range (e.g., the contrast) of the pattern to be sufficiently low that the generated artifacts may be characterized. Some degree of oversharpening is typically desirable (e.g., to enhance the perception of edge sharpness), and it may be desirable to allow for sufficient headroom to distinguish acceptable artifacts from unacceptable ones. If the portions of the captured image that correspond to bright sides of edges are too bright, for example, even acceptable overshoots caused by oversharpening may reach or exceed the saturation level, making it impossible to distinguish acceptable overshoots from unacceptable ones. Likewise, if the portions of the captured image that correspond to dark sides of edges are too dark, even acceptable undershoots caused by oversharpening may reach or fall below the zero-intensity level, making it impossible to distinguish acceptable undershoots from unacceptable ones. On a normalized intensity scale of zero to one, for example, it may be desirable for the dark side of an edge to have a value in the range of from 0.2 to 0.4 (e.g., 0.3) and for the bright side of an edge to have a value in the range of from 0.6 to 0.8 (e.g., 0.7).

Task T100 uses a sensor to be tuned (e.g., an instance of a camera model to be tuned) to capture a representation of a reference pattern. For example, multiple instances of task T110 may be performed to use the camera to be tuned to capture an image of each of the reference patterns. Typical captured image sizes for current cellphone cameras and other inexpensive digital cameras include VGA or 0.3-megapixel resolution (640×480 pixels), 1.3 megapixels (e.g., 1280×960 pixels), 2.0 megapixels (e.g., 1600×1200 pixels or UXGA resolution), 3.2 megapixels (e.g., 2048×1536 pixels), 4 megapixels (e.g., 2240×1680 pixels), 5 megapixels (e.g., 2560×1920 pixels) and 6 megapixels (e.g., 3032×2008 pixels). Task T100 may be performed by a human operator or may be partially or fully automated. For example, task T110 may include appropriately placing (whether by hand or automatically) a corresponding one of a set of reference patterns in front of the camera, which may be mounted in a fixed position, and initiating the corresponding capture manually or automatically.

Typically each reference pattern is prepared for capture by printing the pattern as a poster (e.g., of size 8.5 by 11, 11×17, 16×20, 18×24, or 24×36 inches). It may be desirable to reduce illumination nonuniformity (e.g., specular reflection) by, for example, mounting the printed pattern to a flat, rigid surface (e.g., foamcore). Likewise, it may be desirable for the surface of the pattern to be matte or nonreflective. It may be desirable to perform the image capture under uniform illumination conditions across the field of view (at least, over the pattern area that is to be analyzed). For example, it may be desirable to capture the images under uniform illumination (e.g., a diffuse illumination field within a light tent or light booth). Uniform illumination during capture may help to reduce variance among the values of pixels of the same mode. It may be desirable to capture separate images of each of one or more (possibly all) of the reference patterns under at least two different levels of illumination (e.g., bright illumination and dim illumination; or bright, normal, and dim illumination). In another example, each reference pattern is presented (under manual or automatic control) for capture on a screen, such as a plasma display panel or a liquid crystal display panel for transmissive display, or an electronic paper display (e.g., a Gyricon, electrophoretic, or electrowetting display) for reflective display. Again, it may be desirable in such case to capture separate images of each of one or more (possibly all) of the reference patterns under at least two different levels of panel illumination.

During the capture operation, it may be desirable for the reference pattern to be positioned with its center near the camera's optical axis. For a case in which the camera has a fixed-focus lens, it may be desirable to position the reference pattern within the depth of field or within the hyperfocal distance. As the hyperfocal distance may be several feet, it may be desirable for the reference pattern to be large enough (e.g., 24×36 inches) to cover at least a majority of the field of view at that distance. For a case in which the camera has an autofocus lens, it may be desirable to ensure that the lens is properly focused on the reference pattern, and to use a macro mode if the distance between the pattern and the lens is short. It may also be desirable to orient the reference pattern relative to the camera's optical axis to minimize roll or tilt (i.e., rotation of the pattern about the camera optical axis), pitch or skew (i.e., rotation of the pattern about an axis horizontally orthogonal to the camera optical axis), and yaw (i.e., rotation of the pattern about an axis vertically orthogonal to the camera optical axis). Examples of tilt, skew, and yaw are illustrated in FIG. A5A. Such positional error minimization may help to produce a better camera tuning result (e.g., by limiting the maximum amount of blur at any point in the captured image), especially for a case in which the post-processing procedure being tuned operates globally on the image being processed (e.g., as in the adaptive spatial filter described below).

The captured images may be obtained in an uncompressed format (e.g., RGB or YCbCr) or in a compressed format (e.g., JPEG). The capturing operation (i.e., task T110) may also include one or more pre-processing operations, such as flare reduction, data linearization, color balancing, color filter array (e.g., Bayer filter) demosaicing, etc.

Ideally, each captured image would be identical to the corresponding reference pattern. In reality, the captured image will differ from the reference pattern because of nonidealities in the response of the camera, which may be compensated at least partially by the post-processing procedure. However, the captured image will also differ from the reference pattern because of other nonidealities that are introduced by the capturing operation, such as nonidealities in the positioning and/or illumination of the reference pattern. It may be desirable to perform a different operation to compensate for the effects of such operation-specific nonidealities, rather than allowing the camera tuning process to attempt to compensate for them in the post-processing procedure.

One general approach would be to compensate for the effects of operation-specific nonidealities in the captured image by altering the captured image to be more similar to the reference pattern. However, it may be desirable to avoid adding such a layer of processing on the captured image. Altering the captured image may cause a loss of information, which may cause the camera tuning process to produce a suboptimal post-processing procedure (e.g., by obscuring image characteristics that are to be quantified).

Figure 14:
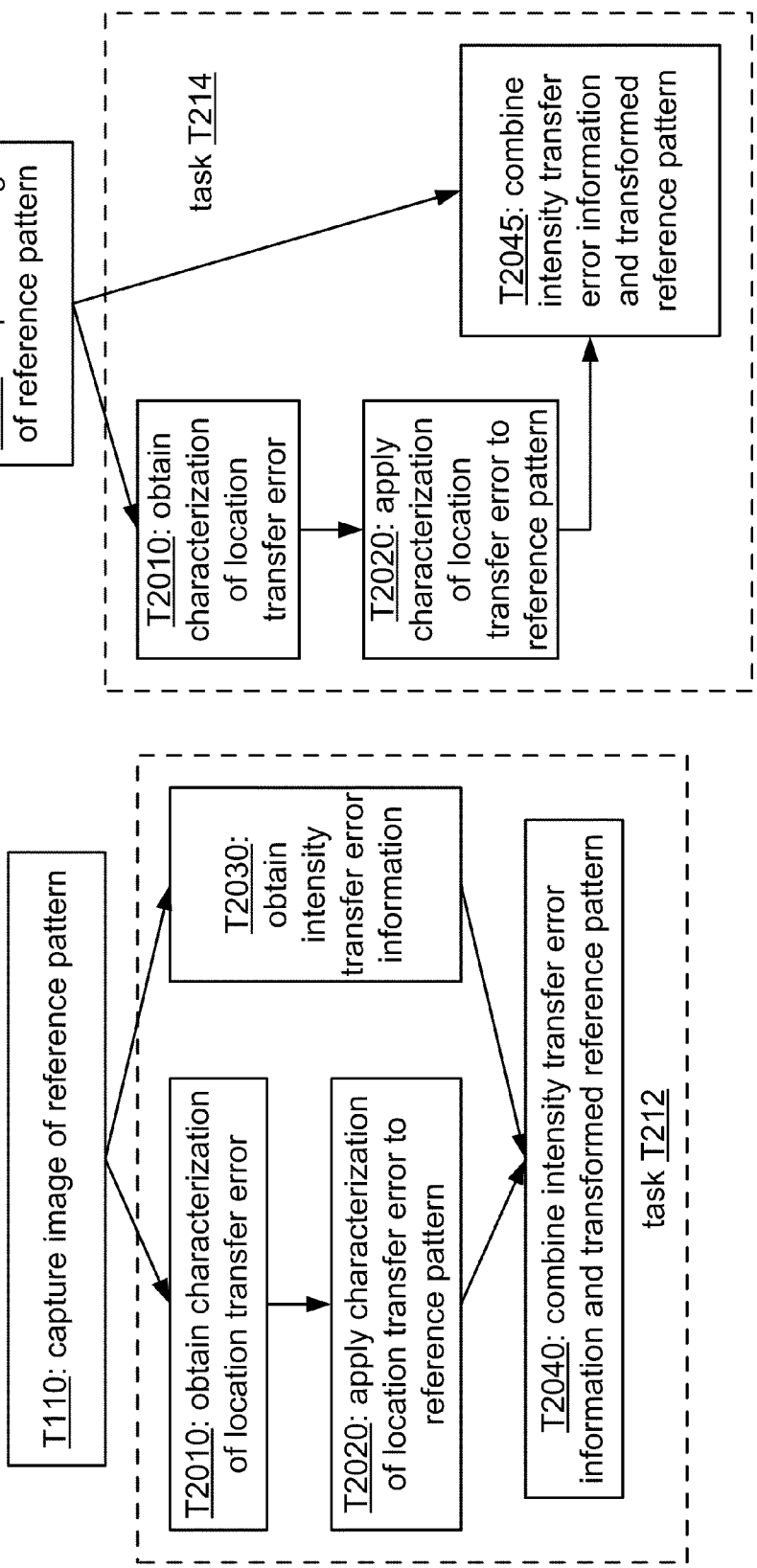
FIG. 14A shows a flowchart that includes a flowchart of an implementation T212 of task T210.
FIG. 14B shows a flowchart that includes a flowchart of another implementation T214 of task T210.

Another general approach as described below is to quantify the effects of nonidealities other than those which are to be compensated by the post-processing procedure (e.g., operation-specific nonidealities), and to apply this information to the reference pattern to create a pattern for matching (also called a target or reinforcement pattern). FIG. 14A includes a flowchart of such an implementation T212 of task T210 that includes tasks T2010 and T2020. Based on a captured image of a reference pattern, task T2010 obtains a characterization of location transfer error. Task T2020 applies the characterization of location transfer error to the corresponding reference pattern to produce a spatially modified (e.g., transformed) reference pattern. For example, task T2020 may be configured to apply the characterization of location transfer error to a copy of an image file that was used to produce the printed reference pattern, to an algorithmic description of the reference pattern, or to another error-free definition or depiction of the reference pattern. In this example, task T212 also includes tasks T2030 and T2040. Based on the captured image, task T2030 obtains intensity transfer error information, and task T2040 combines the intensity transfer error information and the transformed reference pattern to produce a target or reinforcement pattern. It may be desirable to perform a corresponding instance of task T210 (e.g., of task T212 or T214) on each of the captured images.

It may be desirable for the capture operation to be robust to some degree of variation in the relative positions and/or orientations of the camera and the reference pattern being captured. For example, it may be desirable for the capture operation to allow some variation in the distance between the camera and the reference pattern, some translation of the reference pattern relative to the camera optical axis, and some variation in the orientation of the reference pattern relative to the camera's optical axis. Such variation may include roll, pitch, and/or yaw of the reference pattern (e.g., as shown in FIG. 12A). In each instance of task T110 in method M112, the corresponding reference pattern may be oriented differently with respect to the camera. A capture operation that does not allow for such variations may be both difficult to use and prone to error.

At least because of such variation in distance, translation, and orientation, the captured image would differ from the reference pattern even if the camera's lens and sensor were perfect. It may be desirable to quantify such variation. Unless the tuning method can be configured to compensate for such variation, for example, it may prevent a subsequent error analysis operation (e.g., task T400) from producing useful information.

The reference pattern may be implemented to include a number of well-defined features (also called "markers") whose positions in the captured image may be used to define a correspondence between positions in the reference pattern and pixels in the captured image. Such markers may be implemented according to any desired design that supports sufficiently accurate location of the marker's position (e.g., to at least pixel resolution) in the captured image. The locations of the markers in the reference pattern, and the corresponding locations of the markers in the captured image, may then be used to characterize the position transfer error introduced by the capturing operation (e.g., as a spatial warping).

A marker may be implemented as a filled patch within (e.g., at the center of) a larger unfilled patch. In one example, each of two or more of the markers is implemented as a filled circular patch within a square patch, with a high contrast between the circular and square patches (e.g., a black circle within a white patch, or vice versa). In another example, each of two or more of the markers is implemented as a filled circular or square patch of a particular color (a "color dot"). In a further example, each of two or more of the markers is implemented as a color dot (e.g., a filled red circle) within a square white patch. In such cases, task T2010 may be configured to determine the position of the marker in the captured image as the center of gravity of the image of the filled patch. Task T2010 may be configured to detect the pixels of each color dot using a connected component labeling operation. It may be desirable to identify the location of each marker as a particular pixel of the captured image. Alternatively, it may be desirable to identify the location of each marker with subpixel precision. Typically the positions of at least four markers (arranged as points of a quadrilateral) are used to define a unique projective transformation between the captured image and the reference pattern. A projective transformation maps quadrilaterals to quadrilaterals.

FIG. 4 shows a case in which each marker includes a color dot (e.g., a red color dot). Color dots may be useful for accurate position determination even for a case in which only one color is used. However, some error may arise in the transformation due to imprecision in the located positions of the markers in the captured image. For a simple pattern (e.g., a noise quantification pattern as shown in FIG. 4), the degree of accuracy of a transformation that is supported by a single set of four markers may be sufficient. To support a more accurate transformation, it may be desirable to configure task T2010 to locate more than four markers in the reference pattern. When more than four markers are used, however, an ambiguity may arise in the correspondence between markers in the reference pattern and their counterparts in the captured image.

Figure 15:
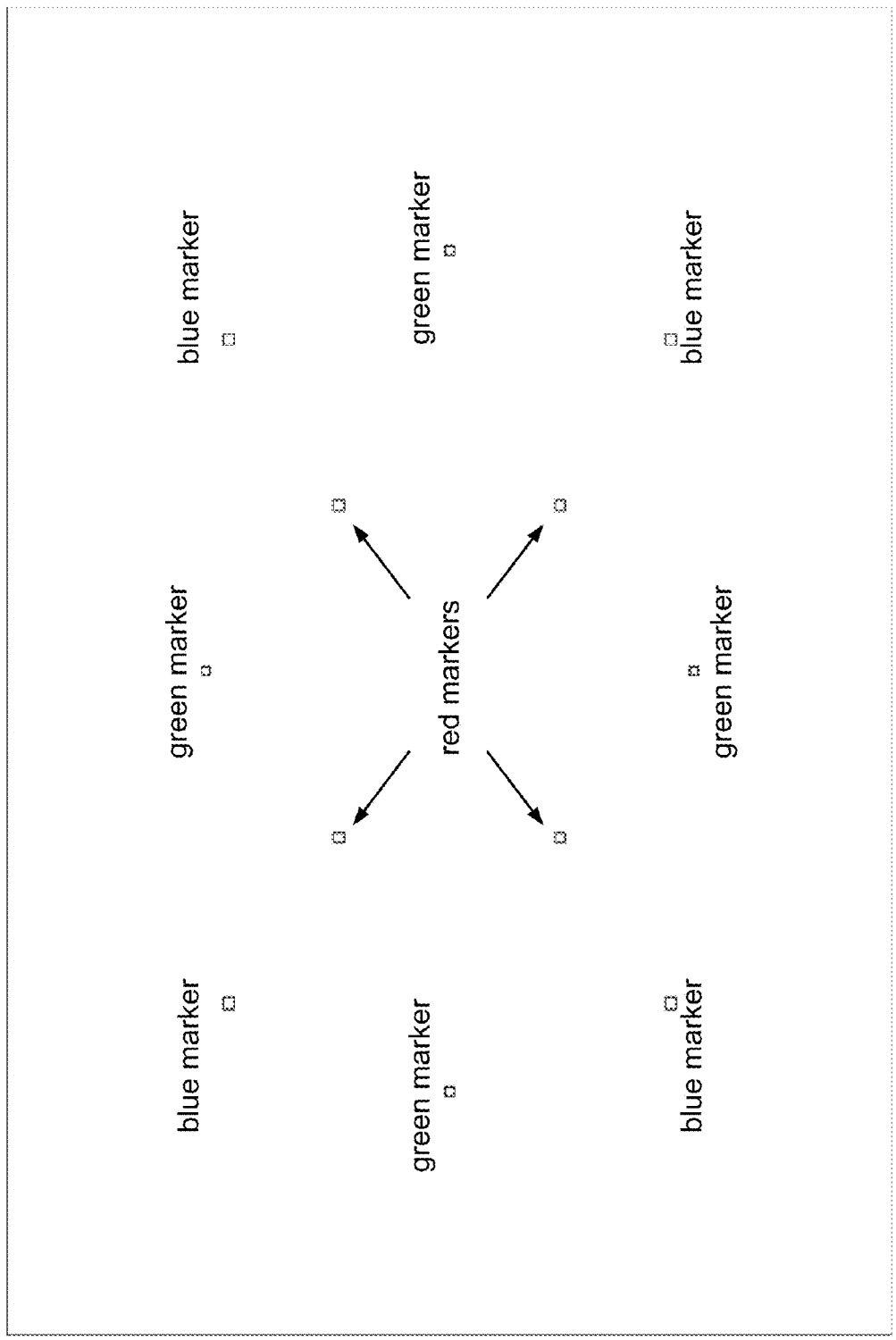
FIG. 15 shows one example of an assignment of colors to the various sets of markers in the patterns shown in FIGS. 5-11.

For a case in which a reference pattern includes more than four markers, it may be desirable for the reference pattern to include two or more sets of markers (with each set having up to four markers) that are configured such that task T2010 may reliably distinguish the markers of each set in the captured image from markers of all other sets. Such markers may be implemented to include filled circular or square patches of a particular color (also called "color dots"). In one such example, the markers of a first set (e.g., of four markers) are color dots of a first color (e.g., red, green, or blue) within white squares, and the markers of a second set (e.g., of four markers) are color dots of a second color (e.g., a different one of red, green, and blue) within white squares. In a further example, the markers of a third set (e.g., of four markers) are color dots of a third color (e.g., the remaining one of red, green, and blue) within white squares. FIGS. 5 to 11 show examples of reference patterns having three sets of four markers, and FIG. 15 shows one example of an assignment of colors to the various sets of markers in these patterns. Task T2010 may be configured to perform detection of each set of markers independently (possibly in parallel). Additional sets of markers may be used for cases in which more than three colors can be readily distinguished (e.g., including cases in which additional color channels are available, such as a yellow color channel). As noted above, task T2010 may be configured to detect the pixels of each color dot using a connected component labeling operation.

The positions of the markers within the reference pattern, together with the corresponding positions of the markers within the captured image, represent information about position and orientation of the reference pattern relative to the camera that existed when the captured image was taken (also called "location transfer error information"), such as the particular variation in the distance between the camera and the reference pattern, translation of the reference pattern relative to the camera optical axis, and variation in the orientation of the reference pattern relative to the camera's optical axis. Task T2020 may be configured to extrapolate this information to map pixels of the captured image to corresponding positions within the reference pattern.

It may be desirable to place the markers of each set in the reference pattern at the corners of a quadrilateral. It may be desirable for such a quadrilateral to have the same aspect ratio as the camera sensor. When more than one set of markers is used, it may be desirable to scale and/or rotate the respective quadrilaterals relative to one another (e.g., such that the markers are distributed evenly in the reference pattern across the camera's field of view). FIG. 15 shows an example in which the quadrilaterals that correspond to each of the three sets of markers are concentric. Specifically, in this figure the red and blue markers are positioned at the vertices of respective and coaxial rectangles, and the green markers are positioned along the axes of the rectangles at the vertices of a rhombus. It may be desirable to repeat the capture operation for a reference pattern if task T2010 detects less than a minimum number of markers (e.g., if any of the markers are absent from the captured image).

Task T2020 is configured to apply the characterization of location transfer error to the reference pattern to obtain a reinforcement pattern. For example, task T2010 may be configured to use the marker locations to calculate the characterization of location transfer error as a transformation, such as a projective transformation, and task T2020 may be configured to apply the calculated transformation to the reference pattern (e.g., using bilinear or bicubic interpolation) to generate the reinforcement pattern. In one example, tasks T2010 and T2020 are configured to use the functions cp2tform and imtransform of the software package MATLAB (The MathWorks, Inc., Natick, Mass.) to calculate and apply the transformation, respectively. Other software packages that may be used by other implementations of tasks T2010 and/or T2020 to perform such operations include GNU Octave (Free Software Foundation, Boston, Mass., www-dot-gnu-dot-org) and Mathematica (Wolfram Research, Champaign, Ill.).

In another example, task T2020 is configured to apply the characterization of location transfer error to the reference pattern to obtain a reinforcement pattern by combining the the characterization of location transfer error with an algorithmic description of the reference pattern. An algorithmic description of the reference pattern of FIG. 11, for example, may specify that the edges occur at rectangles formed by the lines $y=y_C \pm iH/(2N)$, $x=x_C \pm iW/(2N)$ for each integer $i>0$, where $(x_C, y_C)$ is the center of the pattern; H and W are the height and width of the pattern, respectively; $N=\min(\lfloor W/(2\,m)\rfloor, \lfloor H/(2\,m)\rfloor)$; and m is the minimum spacing between edges.

It may be desirable to provide a sufficient number of markers to support a transformation that will account for geometric distortion caused by imperfections of the camera's optical system (e.g., the camera lens), such as barrel distortion or pincushion distortion. Geometric distortion may cause straight lines to appear as curves in the captured image. Such a transformation may include a curve-fitting operation that is configured to fit a curve to the locations of markers in the captured representation.

Correction of location transfer error may help to align edges within the captured representation with corresponding edges within the transformed reference pattern. Some of the remaining error will be due to sensor imperfections. However, some (possibly more) of the remaining error will be due to nonuniformities in the illumination of the reference pattern during capture (also called "intensity transfer error"). Such error may arise due to, for example, a nonuniform illumination field, nonplanarities of the reference pattern, specular reflections from the reference pattern, and/or differences in illumination and/or orientation from one reference pattern to another.

It may be desirable to account for nonidealities in the transfer of light from the illumination source to the camera sensor via the reference pattern. For example, it may be desirable for the capture operation to be robust to some degree of variation in the field of illumination across the reference pattern being captured (or over an area to be analyzed, such as a region within the markers). Another source of intensity transfer error is camera lens rolloff (also called lens falloff or vignetting), which may cause the center of the captured image to be brighter than the periphery even under perfectly uniform illumination. Although cellphone cameras and other inexpensive cameras typically have fixed-aperture lenses, it is noted that lens rolloff may vary with lens aperture. Intensity transfer error may cause a captured image of a bimodal pattern to be non-bimodal and/or may cause a captured image of a region having uniform reflectance or brightness to have non-uniform luminance, even if the sensor used to capture the image has a perfectly uniform response across its surface.

In one example, task T2030 is configured to create a map of intensity transfer error information by performing a block-based mode filtering operation on the captured image. This operation includes dividing the captured image into a set of nonoverlapping blocks, calculating the mode value (i.e., the most frequently occurring value) for each block, and replacing the values of the pixels of each block with the corresponding mode value. Typical block sizes include 8×8, 16×16, 32×32, 8×16, and 16×8 pixels.

In another example, task T2030 is configured to create a map of intensity transfer error information by performing a window-based mode filtering operation on the captured image. This operation includes passing a window across the image, calculating the mode value at each position of the window, and replacing the value of the pixel at the center of the window with the calculated mode value. An image produced using a window-based mode filtering operation may more accurately reflect gradual changes in the illumination field across the image and/or may contain edges that are less noisy as compared to an image produced using a block-based mode filtering operation. Typical window sizes include 9×9, 51×51, 101×101, and 201×201 pixels.

In a further example, task T2030 is configured to create a map of intensity transfer error information by performing a combined block- and window-based mode filtering operation on the captured image such that all of the pixels within a block (e.g., of 3×3, 5×5, 7×7, or 9×9 pixels) at the center of each window are given the same value (e.g., the mode value as calculated over the window). Alternatively, task 2030 may also be configured to use a different nonlinear operation that smoothes local noise but also enhances edges.

Task T2040 is configured to combine the intensity transfer error information and the transformed reference pattern to produce a reinforcement pattern. For example, although a mode-filtered image may provide important information about the illumination over the reference pattern during capture, it may also contain inaccuracies at edge transitions. Task T2040 may be configured to combine the intensity transfer error information and the transformed reference pattern by imposing the transitions of the transformed reference pattern on the mode-filtered image. For example, task T2040 may be configured to produce the reinforcement pattern by moving the transitions of the mode-filtered image according to the positions of the corresponding transitions in the transformed reference pattern (e.g., by reconstructing the transition point in the mode-filtered image). Alternatively, task T2040 may be configured to combine the intensity transfer error information and the transformed reference pattern by replacing each pixel of the transformed reference pattern with a corresponding pixel of the mode-filtered image according to an intensity similarity criterion. Typically the reinforcement pattern is the same size as the captured image.

It may be desirable for task T2040 to use the transformed reference pattern to indicate the mode with which each pixel is associated (e.g., the low-intensity mode or the high-intensity mode for a bimodal pattern) and to use the mode-filtered image to indicate the particular pixel values that are locally associated with each mode. For example, task T2040 may be configured to use pixel values of the transformed reference pattern to detect mode errors in the mode-filtered image. In one such example, task T2040 detects a mode error when either a pixel value of the mode-filtered image is above a local intermodal threshold value and the corresponding pixel value of the transformed reference pattern indicates a low-intensity mode, or the pixel value of the mode-filtered image is below the local intermodal threshold value and the corresponding pixel value of the transformed reference pattern indicates a high-intensity mode In one example, the local intermodal threshold value is calculated over a 51×51-pixel window centered at the corresponding pixel of the captured image. Task T2040 may be configured to calculate the local intermodal threshold value according to any suitable technique, such as by applying Otsu's method to a window that includes the current pixel, by taking an average (e.g., the mean or median) of a window that includes the current pixel, etc.

FIG. 14B includes a flowchart of such an implementation T214 of task T200. Task T214 includes an implementation T2045 of task T2040 that obtains intensity transfer error information (as described above with reference to task T2030) and combines it with edge location information from the transformed reference pattern to produce a reinforcement pattern. In this case, the mode-filtering operation is performed under a constraint provided by the transformed reference pattern (e.g., a mode indication for each pixel). Rather than calculating each mode value over the entire block or window, task T2045 restricts the selection range based on the value of the corresponding pixel of the transformed reference pattern. For example, task T2045 may be configured to select, in each block or window, the most frequently occurring value that is within a particular intensity range (e.g., a range that is above or below a local intermodal threshold value as described above, according to the particular mode indication) or, alternatively, the mean of the values that are within the particular intensity range.

It may be desirable for task T2045 to include calculating a histogram of the block or window. It is also possible for task T2045 to use a window of one size to calculate the local intermodal threshold value and a window of a different size to calculate the pixel value for the selected mode or, alternatively, to use the same window for each operation. It is also noted that mode errors are likely to occur only near edges within the mode-filtered image, such that it may be unnecessary to check for mode errors at pixels of the mode-filtered image that are far from edges (e.g., at least two, three, four, or five pixels away).

Task T300 performs a post-processing procedure on one or more of the captured representations to obtain corresponding processed representations. For example, task T310 may be configured to perform an adaptive spatial filtering operation such as any among the range of those described in U.S. Publ. Pat. Appl. No. 2008/0031538, entitled "ADAPTIVE SPATIAL FILTER FOR FILTERING IMAGE INFORMATION" ("Jiang"), which is incorporated by reference for purposes limited to disclosure of implementations of task T310 (including disclosure of apparatus configured to perform such a task). Such an adaptive spatial filter, which may have a large number of parameters, may be configured to reduce noise while finding an optimal balance between edge sharpness and artifact generation. It may be desirable for task T300 to perform the same post-processing procedure (i.e., using the same parameter values) on each among the set of captured representations. For a case in which multiple sets of captured images are taken under different respective capture conditions (e.g., different respective illumination levels), it may be desirable for task T300 to use a different corresponding set of parameter values for each set of captured representations.

The adaptive spatial filter may include a smoothing filter KS10. This smoothing filter may be implemented as an averaging filter, with the degree of averaging being controlled according to the value of a smoothing parameter. Expression (1) of Jiang describes the following example of such a filter: $v_s = \frac{1}{8} *[1\ 1\ 1;\ 1\ 1\ 1;\ 1\ 1\ 1] + (1-p/100)*(\frac{1}{8})*[-1\ -1\ -1;\ -1\ 8\ -1;\ -1\ -1\ -1]$, where $v_s$ indicates the smoothed pixel value. In this example, the smoothing parameter p is implemented to have a range of values from zero (zero percent smoothing) to one hundred (100 percent smoothing). In another example, the smoothing parameter is implemented to have a range of values from zero (no smoothing) to one (100 percent smoothing). In a further example, the smoothing parameter is implemented to have fifteen possible values over the range of from zero (no smoothing) to fourteen (100 percent smoothing). It is also possible to use a 5×5 smoothing filter rather than the 3×3 filter described above.

The adaptive spatial filter may include one or more filters for edge sharpening. For example, the adaptive spatial filter may include a filter KH10 configured to sharpen horizontal edges and a filter KV10 configured to sharpen vertical edges. Each such filter may be implemented as a square kernel (i.e., a square convolution mask). Expressions (2) and (3) of Jiang describe the following examples of 5×5 horizontal and vertical edge sharpening kernels, respectively: $v_H = \frac{1}{6}*[-1\ -1\ -1\ -1\ -1;\ -2\ -2\ -2\ -2\ -2;\ 6\ 6\ 6\ 6\ 6;\ -2\ -2\ -2\ -2\ -2;\ -1\ -1\ -1\ -1\ -1]$ and $v_V = \frac{1}{6}*[-1\ -2\ 6\ -2\ -1;\ -1\ -2\ 6\ -2\ -1;\ -1\ -2\ 6\ -2\ -1;\ -1\ -2\ 6\ -2\ -1;\ -1\ -2\ 6\ -2\ -1]$, where $v_H$ indicates the horizontally sharpened pixel value and $v_V$ indicates the vertically sharpened pixel value. A respective gain factor for each sharpening filter (e.g., a horizontal sharpening gain factor $k_H$ and a vertical sharpening gain factor $k_V$) may be implemented as a multiplier applied to the result of convolving the image with the corresponding kernel (e.g., to values $v_H$ and $v_V$, respectively). In one particular example, horizontal sharpening gain factor $k_H$ and vertical sharpening gain factor $k_V$ are each implemented to have four hundred one possible values uniformly distributed over the range of from zero to 4.00 (i.e., 0.00, 0.01, 0.02, and so on). Other examples of sharpening filters that may be used in task T310 include unsharp masking.

Figure 16:
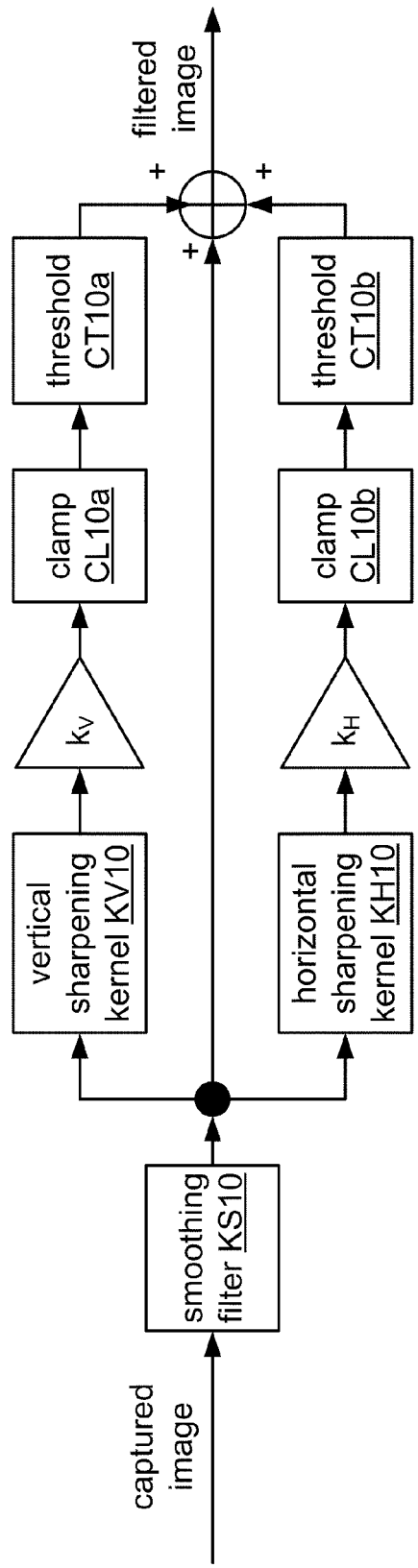
FIG. 16 shows a block diagram of a filtering operation performed by an implementation of task T310.

The adaptive spatial filter may be configured to perform edge sharpening in a processing path that is parallel to a smoothing operation. Alternatively, the adaptive spatial filter may be configured to perform edge sharpening in series with a smoothing operation. For example, task T310 may be configured to perform a filtering operation as shown in FIG. 16 (and as described in Jiang with reference to FIG. 2) in which edge sharpening operations are performed in series with a smoothing operation (smoothing filter KS10), with vertical edge sharpening and horizontal edge sharpening operations (kernels KV10 and KH10, with respective gain factors $k_V$ and $k_H$) being performed separately and in parallel on the result of the smoothing operation.

It may be desirable to configure task T310 such that at least the edge sharpening operations are performed only on the luminance channel (e.g., the Y channel) of the captured image. Applying different sharpening operations to the color channels of an image may cause color artifacts in the resulting sharpened image. Task T310 may be configured to operate only on the luminance channel of the image being processed.

As described above, task T310 may be configured to perform an edge sharpening operation using a fixed kernel and a variable gain factor value. In some cases (e.g., in gradient areas of an image), however, the use of a fixed sharpening kernel such as [−1 −2 6 −2 −1; −1 −2 6 −2 −1; −1 −2 6 −2 −1; −1 −2 6 −2 −1; −1 −2 6 −2 −1] may create cross-hatch artifacts in the processed image. In another example, task T300 may be configured to perform an edge sharpening operation using variable kernel values. In such case, it may be desirable to impose one or more constraints, such as symmetry around the middle row and column (i.e., top/bottom and left/right symmetry). This symmetry constraint reduces a 5×5 kernel to nine parameters. In one such example, task T310 is implemented to perform a vertical edge sharpening operation and a horizontal edge sharpening operation, with each operation having nine parameters that define a variable kernel. In a further example, a gain factor value as described above is also included, for a total of ten parameters for each edge sharpening operation.

The adaptive spatial filter may include a clipping or clamping operation CL10 on the output of an edge sharpening operation. For example, clamp CL10 may be configured to include a maximum positive sharpening limit e2 (e.g., such that sharpened values higher than e2 are clamped at e2). Alternatively or additionally, clamp CL10 may be configured to include a maximum negative sharpening limit e3 (e.g., such that sharpened values less than minus e3 are clamped at minus e3). Limits e2 and e3 may have the same value or different values, and such operations may be implemented on the outputs of both of the vertical and horizontal edge sharpening operations (e.g., as shown in FIG. 16, with respective instances CL10a, CL10b of clamp CL10). Typically the same values of e2 and of e3 are used for both of the vertical and horizontal edge sharpening operations, but it is also possible to use different values of e2 and/or of e3 for these operations. In one particular example, e2 is implemented to have one hundred one possible values over the range of from zero to one hundred (e.g., 0, 1, 2, and so on), and e3 is equal to e2.

The adaptive spatial filter may include a thresholding operation CT10 that applies a sharpening subtraction threshold e1. Such an operation may be configured, for example, such that pixels of a sharpened image that have a magnitude of less than e1 are reduced to zero, and such that e1 is subtracted from pixels of a sharpened image that have a magnitude of at least e1. In one particular example, e1 is implemented to have 101 possible values over the range of from zero to 100 (e.g., 0, 1, 2, and so on). It may be desirable to configure task T310 to apply threshold e1 downstream of limits e2 and e3 (e.g., as shown in FIG. 16, with respective instances CT10$a$, CT10$b$ of threshold CT10 in the vertical and horizontal sharpening paths). In one example, task T310 has six parameters: p, $k_H$, $k_V$, e1, e2, and e3. In another example, task T310 has eighteen additional parameters (nine for each of the two 5×5 sharpening kernels as described above).

Each instance of task T310 may be configured to process a corresponding one of a set of captured images (possibly with multiple instances of task T310 executing in parallel) and to produce a corresponding processed image from the captured image. Task T310 may be configured to produce each processed image as the sum of a corresponding smoothed image, vertical sharpened image, and horizontal sharpened image (e.g., as shown in FIG. 16). It may be desirable to implement multiple instances of method M110, each including multiple instances of task T310, to process multiple sets of captured images (e.g., corresponding to different illumination levels) according to different respective sets of parameter values to produce corresponding multiple sets of processed images.

Task T400 evaluates one or more filtered representations, as produced by task T300, with respect to corresponding patterns for matching. It may be desirable to configure task T400 to use a consistent metric to describe the quality of a filtered representation. For example, task T400 may be configured to quantify the error between a filtered representation and the corresponding pattern for matching in terms of a cost function, whose terms may be weighted according to a decision regarding their relative importance or priority in the particular implementation. A term of the cost function may be weighted more heavily, for example, to increase the degree of negative reinforcement of the behavior represented by the term.

Respective instances of task T400 may be configured to evaluate a cost function for each among a set of filtered representations. In such case, task T400 may be configured to produce an overall cost function value as an average of the various evaluations. Alternatively or additionally, task T400 may be configured to evaluate a cost function based on information from two or more (possibly all) among the set of filtered representations. It may be desirable to implement multiple instances of method M110, each including multiple instances of task T410, to produce a separate evaluation measure for each set among multiple sets of processed images (e.g., with each set corresponding to a different illumination level).

In one example, task T410 uses a four-term cost function $f = w_1 p + w_2 n + w_3 o + w_4 s$, where p denotes the pixel-by-pixel error of the processed image with respect to the reinforcement pattern, n denotes a noise measure, o denotes an oversharpening measure, s denotes a sharpness measure, and $w_1$ to $w_4$ denote weight factors. In one particular example, each of weights $w_1$, $w_2$, and $w_4$ has a value of one. It may also be desirable to configure method M102 to combine evaluation results from the multiple instances of task T400. For example, it may be desirable to configure method M112 to combine evaluation results from the multiple instances of task T410 into a single cost function as described herein. In such case, one or more (possibly all) of the instances of task T410 may be configured to produce evaluation results for fewer than all of the terms of the cost function.

Task T410 may be configured to calculate the pixel-by-pixel error p as the RMS error between the processed image and the corresponding reinforcement pattern. In this case, task T410 may be configured to subtract the processed image from the reinforcement pattern, calculate the sum of the squares of the values of the resulting difference image, normalize the sum by the image size, and produce the value of p as the square root of the normalized sum.

Method M112 may be configured to calculate the value of p as an average error among the set of processed images. Alternatively, method M112 may be configured to calculate the value of p from fewer than all of the processed images. For example, method M112 may include an instance of task T410 that is configured to calculate the value of p as the RMS error of a noise quantification pattern (e.g., as shown in FIG. 4).

The noise measure n quantifies the presence of noise in a processed image. As compared to the image sensors used in high-quality cameras, such as digital single-lens-reflex (SLR) cameras, the image sensors used in inexpensive cameras, such as cellphone cameras, tend to be much smaller and have smaller pixel sites. Consequently, images captured by the smaller sensors tend to have lower signal-to-noise ratios (SNRs). Task T410 may be configured to calculate the noise measure based on a variance in each of one or more patches of a noise quantification pattern. In one example as applied to FIG. 4, this measure is calculated as the sum of the standard deviations in each of the three patches. It may be desirable to configure such an instance of task T410 to locate the patches automatically. In one such example, method M110 is configured to repeat task T2020 to apply the transformation to each of a set of three mask images, each corresponding to the area occupied by a corresponding one of the patches in the reference pattern, and task T410 is configured to use each of the transformed mask images to locate the corresponding patch. Alternatively, task T410 may be configured to calculate noise measure n using any other technique for characterizing fixed-pattern noise.

The oversharpening or "overshoot/undershoot" measure o quantifies the presence of oversharpening artifacts in the processed image. Typically, it is desirable to have some degree of oversharpening, as it tends to enhance the perception of sharpness. Too much oversharpening, however, may create excessive, visible, and objectionable overshoots and/or undershoots, and it may be desirable for the cost function to include a term that penalizes the presence of oversharpening artifacts. FIG. 13 shows examples of overshoot pixels (i.e., overly bright pixels near a transition from a darker region) and undershoot pixels (i.e., overly dark pixels near a transition from a brighter region). The presence of such artifacts near oversharpened edges is also called a "halo effect" or "edge banding."

Figures 17A, 17B:
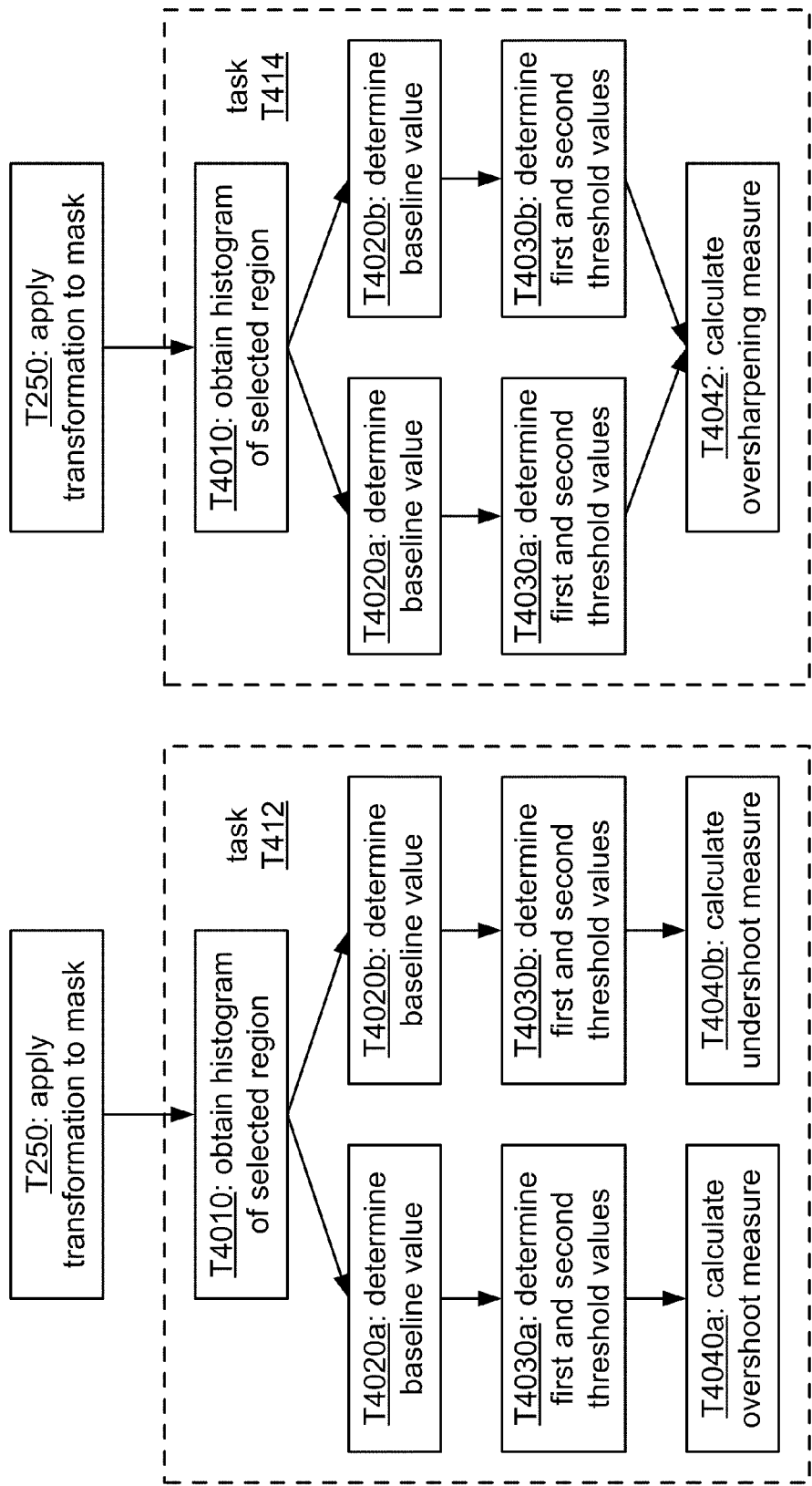
FIG. 17A includes a flowchart of an implementation T412 of task T410.
FIG. 17B includes a flowchart of an implementation T414 of task T410.

FIG. 17A includes a flowchart of an implementation T412 of task T410 that calculates a value for oversharpening measure o. The flowchart of FIG. 17A also shows a task T250 that applies a transformation to a mask image (e.g., a binary image in which selected pixels have one value and all other pixels have the other value) to produce a transformed mask image. The mask image selects a particular region of an oversharpening artifact quantification reference pattern. For example, it may be desirable for the mask image to select a region that contains an area near at least one edge. In one such example, the mask image selects a region that contains at least two adjacent edges. For a bimodal reference pattern, it may be desirable for the mask image to select a region of the reference pattern that has substantially the same number of pixels (e.g., to within one, five, ten, or twenty percent) of each intensity mode. The transformation that task T250 applies to the mask image is the same transformation that is used (e.g., in task T2020 as described above) to obtain a reinforcement pattern from the oversharpening artifact quantification reference pattern. This transformation describes the spatial warping between the oversharpening artifact quantification pattern and the corresponding captured image, such that the resulting transformed mask image selects the desired region from the corresponding filtered image. Task T250 may be included within task T210 (e.g., within task T2020).

Task T4010 takes a histogram of the selected region of the filtered image. Although it may be possible to evaluate sharpening performance over any one or more regions of the processed image, it may be desirable to select regions near the center of the reference pattern. For example, it may be desirable to configure the mask image to select a region that is close to the center of the reference pattern (e.g., near the center of the lens). The resolving power of the camera's lens is likely to be stronger near the optical axis than near the periphery, and optimizing a sharpening operation over a region near the periphery may cause oversharpening near the center.

In a typical case, the oversharpening artifact quantification reference pattern and the region selection are designed so that the histogram has two peaks, one corresponding to the brighter side of the edge or edges and the other corresponding to the darker side. For the brighter side, task T4020a determines a high-intensity baseline value that is an average of the corresponding histogram peak. In one example, the baseline value is the mode (i.e., the most frequently occurring value) of the corresponding histogram peak. In another example, the baseline value is the mean of the pixel values that are greater than a midpoint of the histogram.

Figure 18:
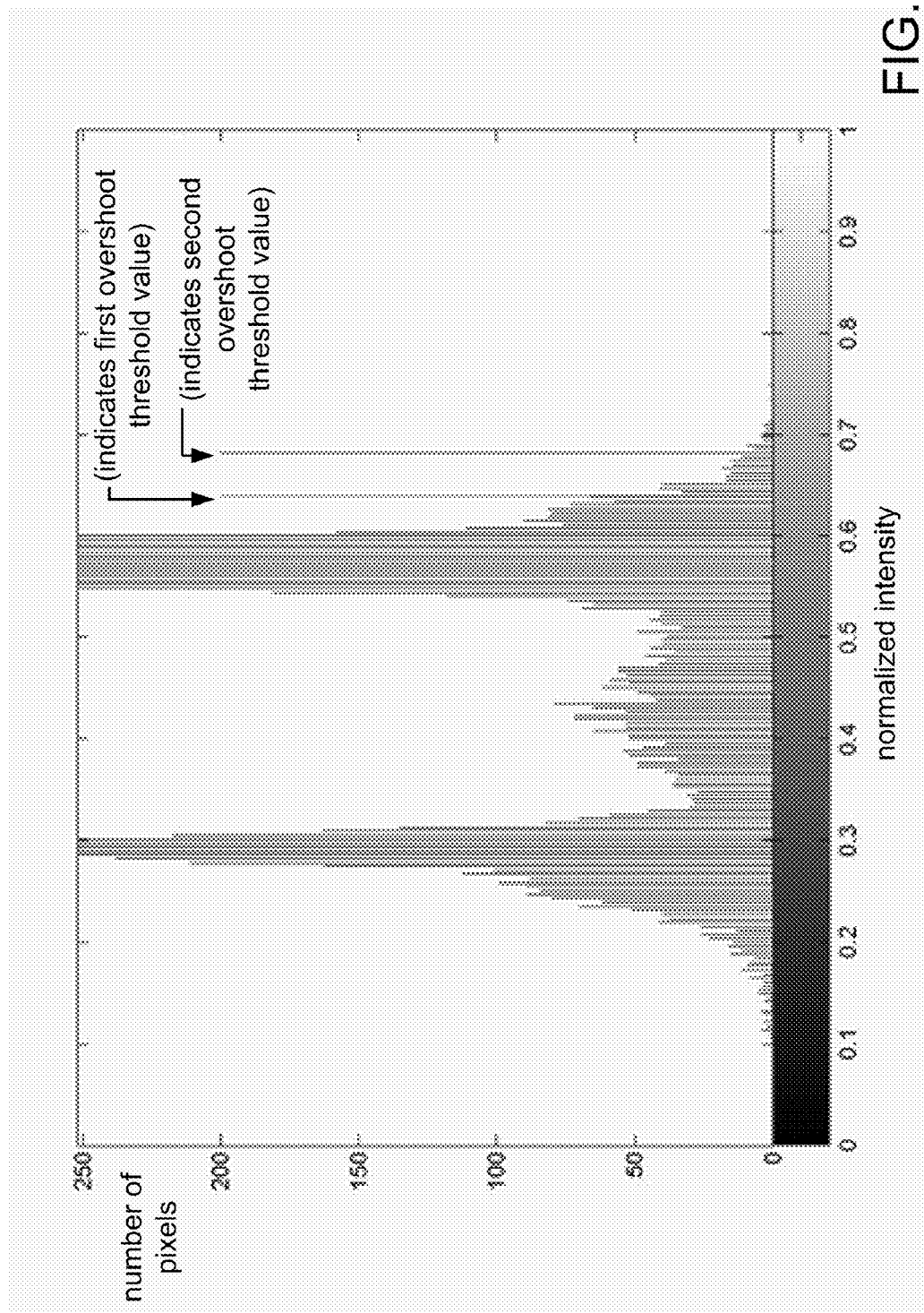
FIG. 18 shows a histogram of a selected region of a filtered image.

Based on this baseline value, task T4030a determines corresponding first and second overshoot threshold values. Task T4030a may be configured to determine the first threshold value from a range of from 110% or 115% to 120%, 125%, or 130% of the baseline value. In one example, task T4030a calculates the first threshold value as 115% of the baseline value. Task T4030a may be configured to determine the second threshold value from a range of from 115% or 120% to 130%, 140%, or 150% of the baseline value. In one example, task T4030a calculates the second threshold value as 122.5% of the baseline value. FIG. 18 shows an example of a histogram of a selected region of a filtered representation of an oversharpening artifact quantification pattern in which first and second overshoot threshold values are indicated. Task T4030a may be configured to calculate the first and/or second threshold values differently for bright and dim illumination conditions.

It may be desirable to calculate an oversharpening measure based on a number of oversharpening artifact pixels (e.g., a number of overshoot and/or undershoot pixels) in the region. In such case, it may be desirable to weight each artifact pixel according to the magnitude of its error. Based on the first and second threshold values, task T4040a calculates an overshoot measure. In one general example, task T4040a is configured to calculate the number of unacceptable pixels in the region as the number of pixels having values greater than (alternatively, not less than) the first threshold value and not greater than (alternatively, less than) the second threshold value. In this example, task T4040a may also be configured to calculate the number of very unacceptable pixels in the region as the number of pixels having values greater than (alternatively, not less than) the second threshold value.

Such an implementation of task T4040a may be configured to calculate the overshoot measure based on the numbers of unacceptable and very unacceptable pixels. For example, task T4040a may be configured to calculate the overshoot measure according to an expression such as $Mo=wuoPuo+wvoPvo$, where Mo denotes the overshoot measure, Puo denotes the number of unacceptable overshoot pixels, Pvo denotes the number of very unacceptable overshoot pixels, and wuo and wvo denote weight factors. Typically, the value of wvo is much larger (e.g., five to twenty times larger) than the value of wuo. In one example, the ratio wuo/wvo is equal to 0.075. It may be desirable to select the ratio wuo/wvo (possibly dynamically) according to an observed ratio of Puo and Pvo, such that the terms wuoPuo and wvoPvo may be expected to be approximately equal. In another particular example, the value of wuo is one and the value of wvo is twenty.

It may be desirable to configure task T4040a to normalize the pixel count numbers. For example, task T4040a may be configured to normalize the values Puo and Pvo by dividing each value by the total number of pixels in the region, or by dividing each value by the number of pixels having values greater than (alternatively, not less than) the baseline value. Task T4040a may be configured to use different values of wuo and/or wvo (e.g., according to a different value of wuo/wvo) for bright and dim illumination conditions.

Task T4040a may be configured to calculate the number of pixels whose values are greater than the baseline value but less than (alternatively, not greater than) the first threshold value, and to calculate the overshoot measure based on this number. Alternatively, such pixels may be considered to be acceptable. As noted above, for example, some degree of oversharpening by the post-processing procedure may be desirable (e.g., to enhance the perception of edge sharpness in the image), and task T4040a may be configured to ignore these pixels.

For the darker side, task T4020b determines a baseline value that is an average (e.g., the mode) of the corresponding histogram peak. Based on this baseline value, task T4030b determines corresponding first and second undershoot threshold values. Task T4030b may be configured to determine the first threshold value from a range of from 70%, 75%, or 80% to 85% or 90% of the baseline value. In one example, task T4030b calculates the first threshold value as 80% of the baseline value. Task T4030b may be configured to determine the second threshold value from a range of from 50%, 60%, or 70% to 80% or 85% of the baseline value. In one example, task T4030b calculates the second threshold value as 70% of the baseline value. Task T4030b may be configured to calculate the first and/or second threshold values differently for bright and dim illumination conditions.

Based on the first and second threshold values, task T4040b calculates an undershoot measure. In one general example, task T4040b is configured to calculate the number of unacceptable pixels in the region as the number of pixels having values less than (alternatively, not greater than) the first threshold value and not less than (alternatively, greater than) the second threshold value. In this example, task T4040b may also be configured to calculate the number of very unacceptable pixels in the region as the number of pixels having values less than (alternatively, not greater than) the second threshold value.

Such an implementation of task T4040b may be configured to calculate the undershoot measure based on the numbers of unacceptable and very unacceptable pixels. For example, task T4040b may be configured to calculate the undershoot measure according to an expression such as Mu=wuuPuu+wvuPvu, where Mu denotes the undershoot measure, Puu denotes the number of unacceptable undershoot pixels, Pvu denotes the number of very unacceptable undershoot pixels, and wuu and wvu denote weight factors. Typically, the value of wvu is much larger (e.g., five to twenty times larger) than the value of wuu. In one example, the ratio wuu/wvu is equal to 0.075. It may be desirable to select the ratio wuu/wvu (possibly dynamically) according to an observed ratio of Puu and Pvu, such that the terms wuuPuu and wvuPvu may be expected to be approximately equal. In another particular example, the value of wuu is one and the value of wvu is twenty.

It may be desirable to configure task T4040b to normalize the pixel count numbers. For example, task T4040b may be configured to normalize the values Puu and Pvu by dividing each value by the total number of pixels in the region, or by dividing each value by the number of pixels having values less than (alternatively, not greater than) the baseline value. Tasks T4040a and T4040b may be configured such that wuo is equal to wuu and/or that wvo is equal to wvu. Task T4040b may be configured to use different values of wuu and/or wvu (e.g., according to a different value of wuu/wvu) for bright and dim illumination conditions.

Task T4040b may be configured to calculate the number of pixels whose values are less than the baseline value but greater than (alternatively, not less than) the first threshold value, and to calculate the undershoot measure based on this number. Alternatively, such pixels may be considered to be acceptable. As noted above, for example, some degree of oversharpening by the post-processing procedure may be desirable (e.g., to enhance the perception of edge sharpness in the image), and task T4040b may be configured to ignore these pixels.

Task T412 may be configured to evaluate a cost function that has separate overshoot and undershoot terms. Alternatively, task T412 may be configured to produce a value for oversharpening measure o as the sum of overshoot measure Mo and undershoot measure Mu. Alternatively, task T412 may be configured to produce a value for oversharpening measure o as an average of overshoot measure Mo and undershoot measure Mu (possibly with each term being weighted by a corresponding number of pixels). FIG. 17B includes a flowchart for an alternate implementation T414 of task T410 that includes an implementation T4042 of task T4040. Task T4042 produces a value for oversharpening measure o (e.g., as a sum or average of overshoot measure Mo and undershoot measure Mu). In one example, task T4042 calculates the value of o according to an expression such as o=wu(Puo+Puu)/Pt+wv(Pvo+Pvu)/Pt or o=(Puo+Puu)/Pt+(wv/wu)(Pvo+Pvu)/Pt, where wu and wv are weight factors and Pt indicates the total number of pixels in the region.

The edge slope or sharpness measure s quantifies the degree of sharpness (e.g., the slope) of the edges in a processed image. Although it may be desirable to avoid excessive overshoot and undershoot in the processed image, it may also be desirable to obtain a sufficiently steep slope at the edges. Ideally, the slope of each edge in the processed image would be equal to the slope of that edge in the corresponding reinforcement pattern. It may be desirable to calculate the sharpness measure as a measure of a difference between edge slope in the processed image and edge slope in the reinforcement pattern.

Figure 19:
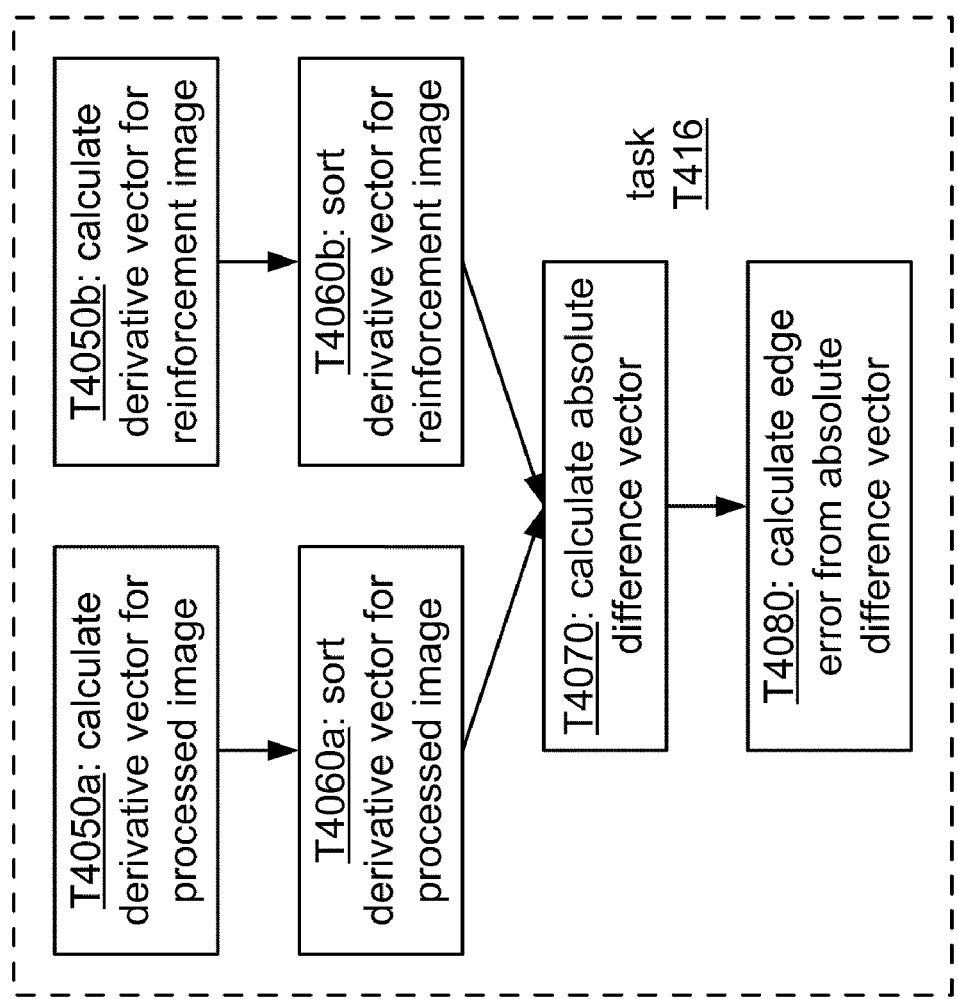
FIG. 19 shows a flowchart of an implementation T416 of task T410.
Figure 20:
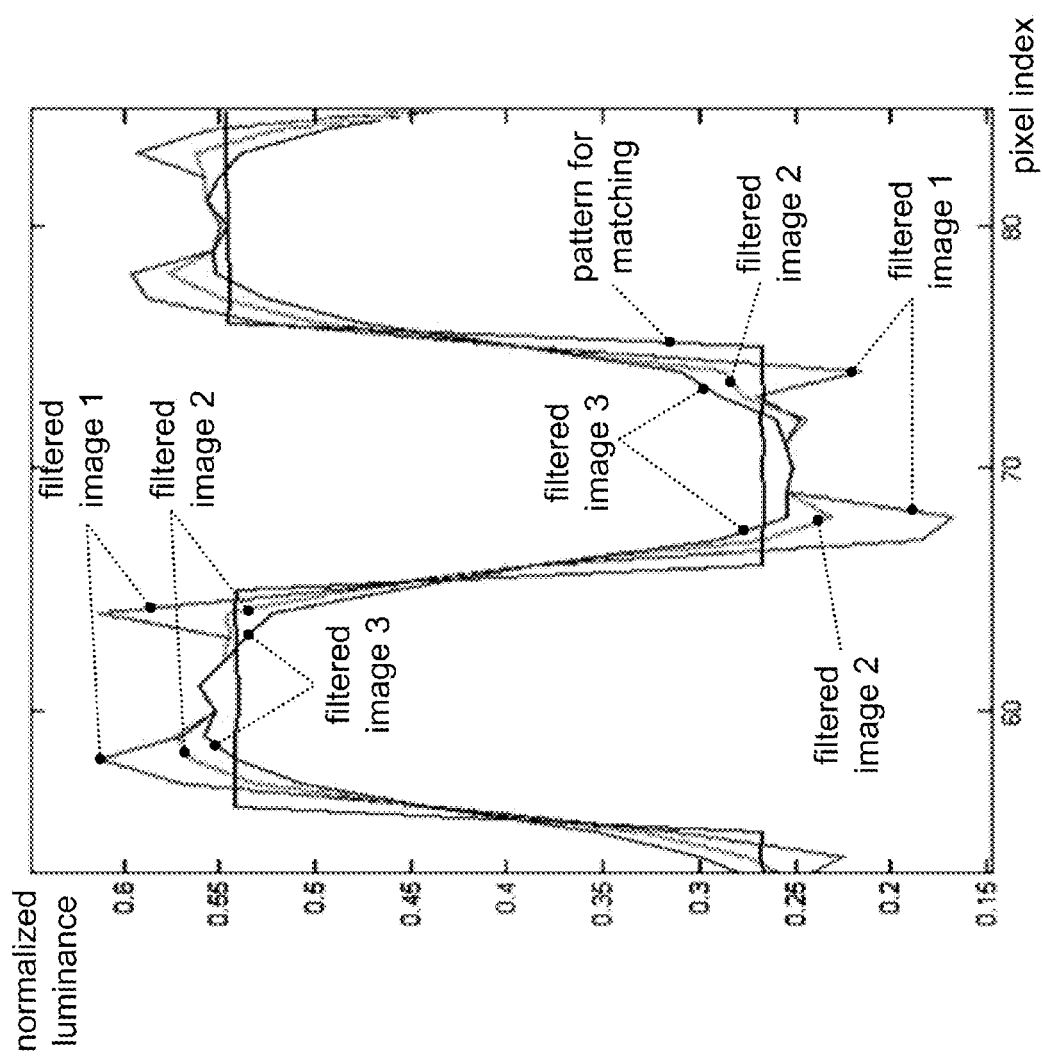
FIG. 20 shows plots of corresponding portions of four image cross-sections.

FIG. 19 shows a flowchart of an implementation T416 of task T410 that may be used to evaluate sharpness measure s (possibly in conjunction with task T412 or T414 for evaluating oversharpening measure o). Task T416 includes a task T4050a that calculates a derivative vector from a cross-section vector for the processed image and a task T4050b that calculates a derivative vector from a cross-section vector for the corresponding reinforcement pattern. FIG. 20 shows a plot of a substantially bimodal portion of a cross-section of a reinforcement pattern and plots of corresponding portions of cross-sections of three processed images that show different degrees of edge sharpness. Generally, tasks T4050a and T4050b may be configured to select cross-section vectors that correspond to the same part of any cross-section of the reference pattern that crosses multiple edges. For example, tasks T4050a and T4050b may be configured to select cross-section vectors according to a transformed mask image (e.g., as produced by a task analogous to task T250 as described above). In such case, it may be desirable for the mask image to select a region near the center of the reference pattern.

Figure 21:
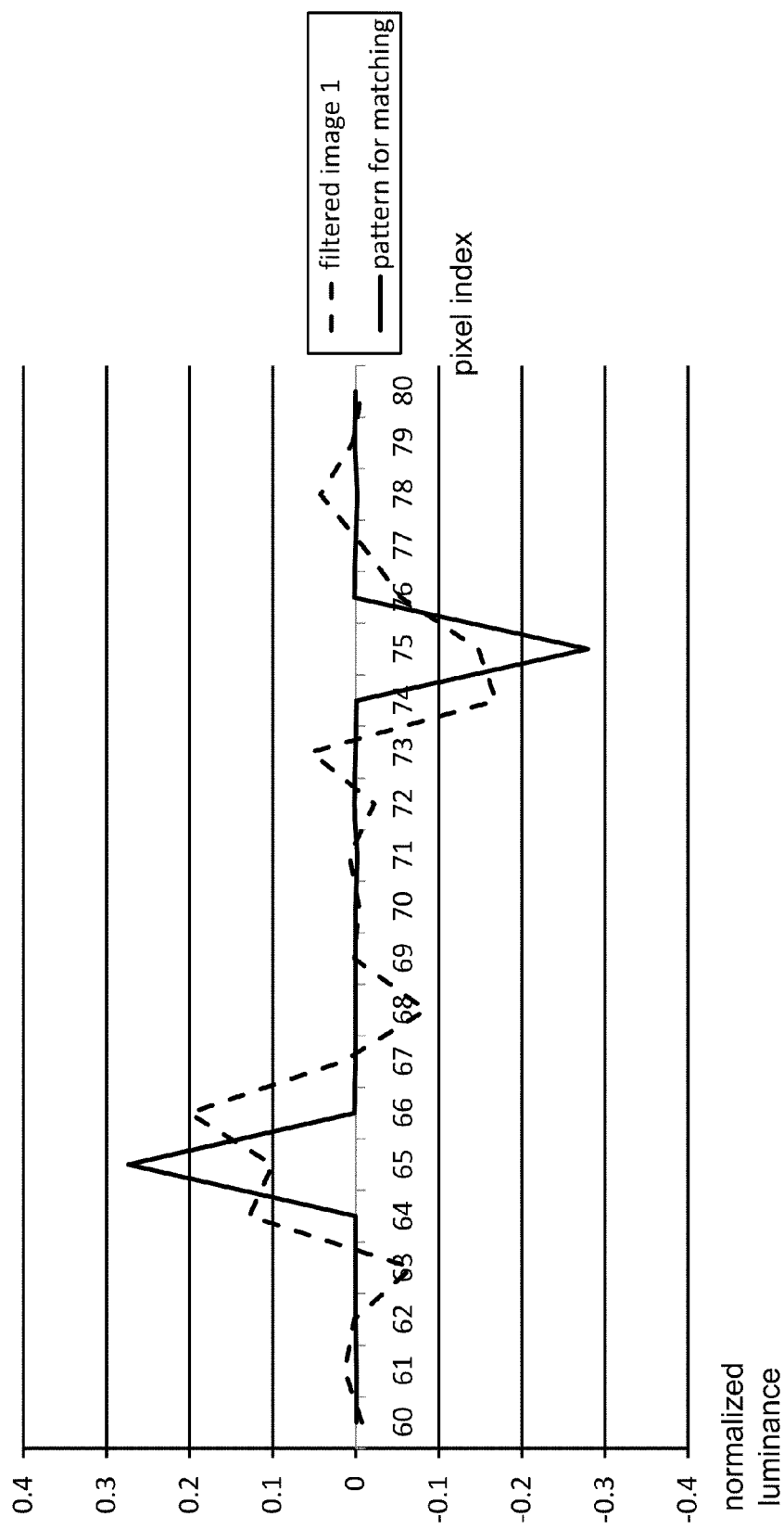
FIG. 21 shows portions of derivative vectors for cross-sections shown in FIG. 20.
Figure 22:
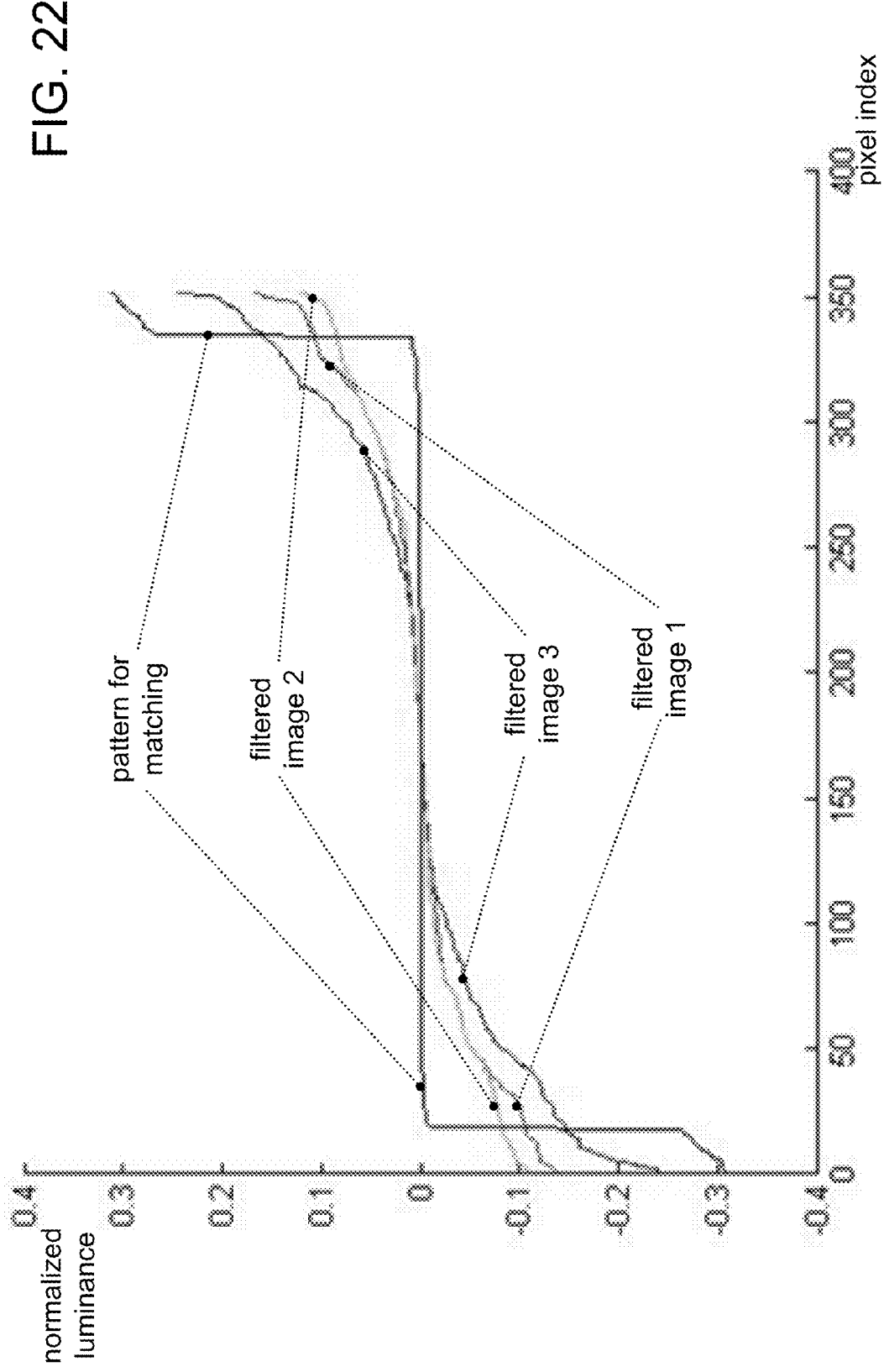
FIG. 22 shows plots of sorted derivative vectors for each of the four cross-sections.

Each of the tasks T4050a and T4050b may be configured to calculate a derivative vector b from a cross-section vector a as a difference vector according to an expression such as b[i]=a[i+1]−a[i]. FIG. 21 shows an example of portions of such derivative vectors for the cross-sections of the pattern for matching and the filtered image 1 shown in FIG. 20. Task T416 also includes tasks T4060a and T4060b that sort the derivative vectors for the processed image and the corresponding reinforcement pattern, respectively. FIG. 22 shows an example of sorted derivative vectors for the cross-sections whose portions are shown in FIG. 20.

Figure 23:
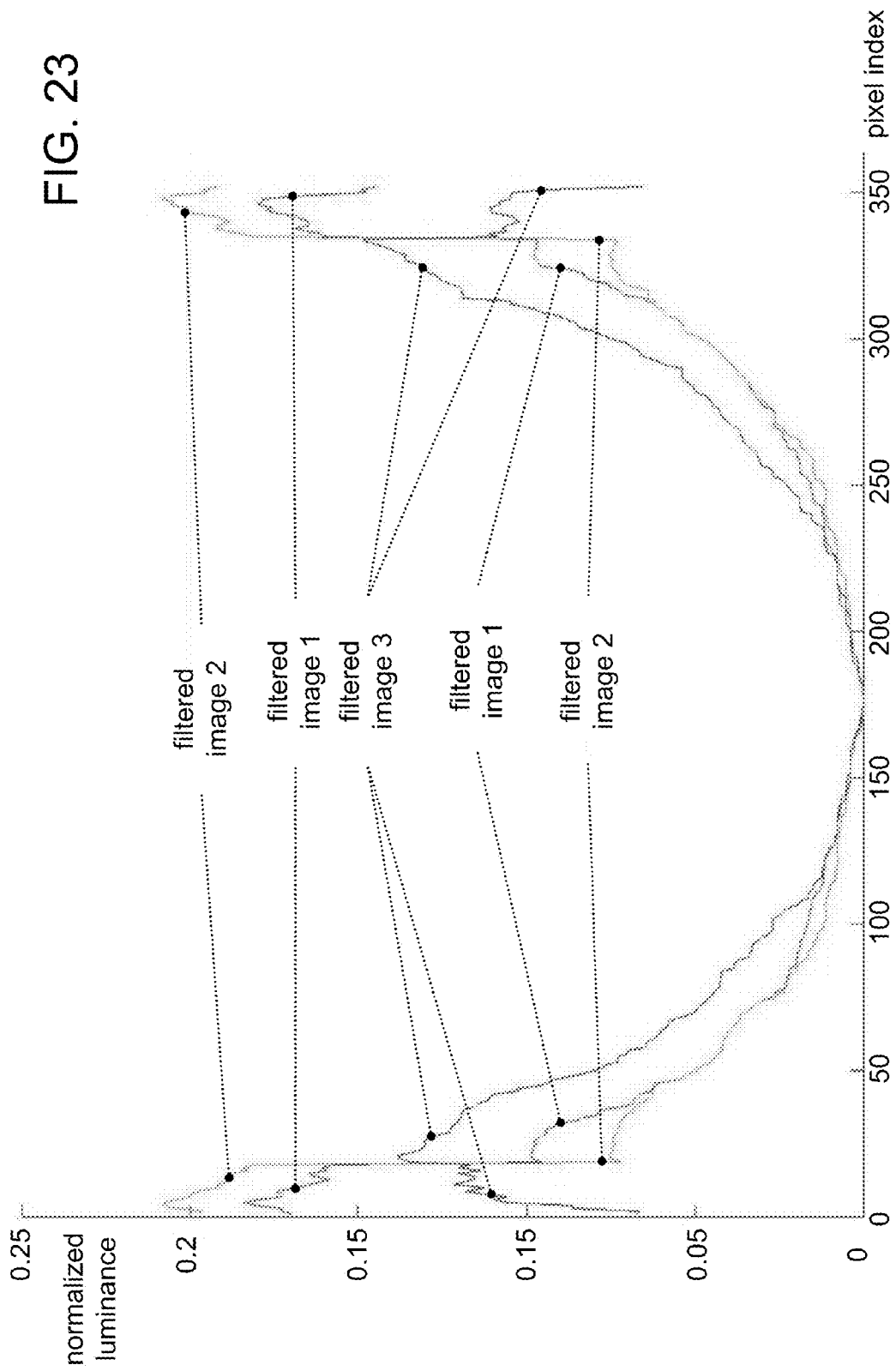
FIG. 23 shows plots of absolute difference vectors for corresponding cross-sections of three filtered images.

Task T416 also includes a task T4070 that calculates an absolute difference vector between the sorted derivative vectors and a task T4080 that calculates a value for measure s as an edge error based on information from the absolute difference vector. FIG. 23 shows plots of absolute difference vectors for the filtered-image sorted derivative vectors of FIG. 22. Task T4080 may be configured to calculate the edge error as an average of terminal values of the absolute difference vector. For example, task T4080 may be configured to calculate the edge error as an average of the first and last one, five, ten, or twenty values of the absolute difference vector. Alternatively, task T4080 may be configured to calculate the edge error as an average of the first and last one, 2.5, four, or five percent of values of the absolute difference vector. Alternatively, task T4080 may be configured to calculate the edge error as an average of values of the absolute difference vector whose indices correspond to indices of terminal values of the sorted derivative vector of the corresponding cross-section from the reinforcement pattern (for example, indices of values of the sorted derivative vector of the reinforcement pattern in FIG. 22 whose magnitudes are greater than 0.2, which may be expected to correspond to edges in the cross-section vector).

It may be desirable to configure task T4080 to calculate the sharpness measure as an overall average of edge errors from more than one absolute difference vector (e.g., of four absolute difference vectors) that correspond to different corresponding cross-sections of the filtered image. In one particular implementation of task T416, instances of tasks T4050a, T4050b, T4060a, T4060b, and T4070 are performed for each of four vertical cross-sections and four horizontal cross-sections, and task T4080 is configured to calculate the sharpness measure as an average of edge errors from each of the eight cross-sections. Method M112 may be configured to calculate sharpness measure s by combining (e.g., averaging) results from multiple instances of task T416, each configured to evaluate a filtered image corresponding to a different respective reference pattern.

Figure 1A:
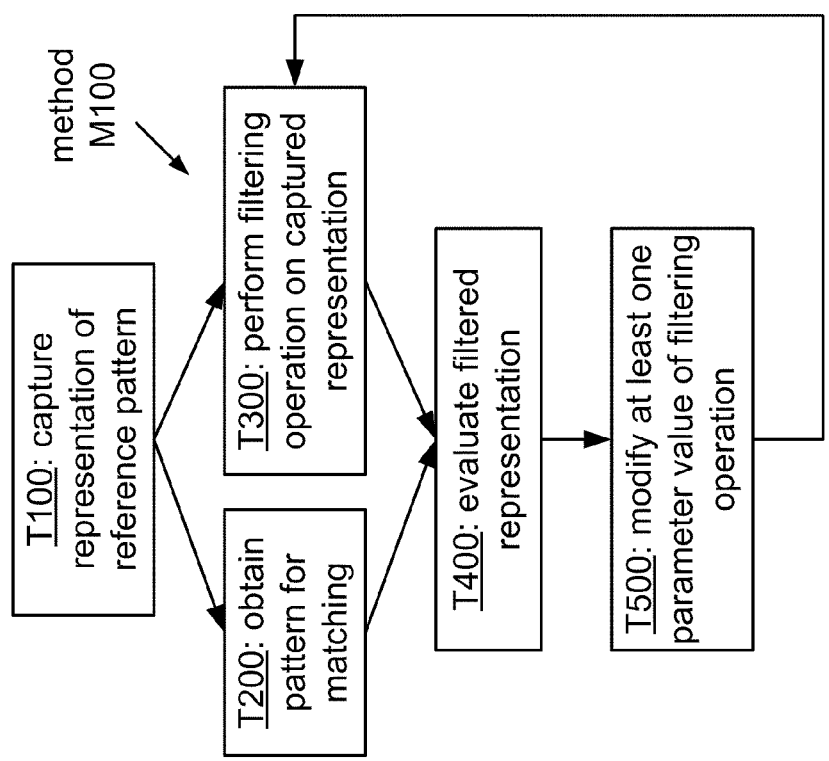
FIG. 1A shows a flowchart of a method M100 according to a general configuration.

Task T500 optimizes parameter values of the post-processing procedure. For example, task T500 may be configured to optimize the parameter values such that the cost function of task T400 is minimized. As shown in FIG. 1A, method M100 may be configured such that task T500 is iterated to generate new parameter values for the post-processing procedure of task T300, which is iterated in turn to generate new filtered representations to be evaluated in task T400, such that the cost function calculated in task T400 is minimized. Such a case may be viewed as a mixture of supervised and unsupervised learning: the fitness function and fitness evaluation phases are unsupervised, but as in supervised learning, the reinforcement signal is provided as an ideal. It may be desirable for method M110 to include a separate instance of task T510 (e.g., separate instances of iterative processing path T310-T410-T510) for each among a set of different illumination levels.

In an example as described above that provides for 15 possible values for p, 401 possible values for each of $k_H$ and $k_V$, and 101 possible values for each of e1 and e2, the solution space includes over twenty-four billion different possibilities. This solution space becomes many times larger if the sharpening kernels are also opened for optimization. Performing an exhaustive search of such a high parametric space is not practical. Therefore it may be desirable to configure task T500 as an implementation of a technique that is suitable for optimizing a large parametric space. One such technique is simulated annealing. Other such techniques include neural networks and fuzzy logic. Another such technique is least-squares optimization, which maps the parameters to a least-squares problem. Some of these techniques may be sensitive to the initial condition (e.g., the set of parameter values used in the first iteration of task T300).

Another technique for optimizing a large parametric space that may be used in task T500 is a genetic algorithm. A genetic algorithm evaluates populations of genomes, where each genome is a genetic representation of the solution domain (i.e., of the parametric space) that encodes a particular set of parameter values. The genetic algorithm iteratively generates a new population of genomes from the previous population until a genome that satisfies a fitness criterion is found and/or until a maximum number of iterations have been performed. The population of genomes (also called "chromosomes") at each iteration of the genetic algorithm is also called a "generation."

In the case of a genetic algorithm, task T500 may be configured to encode the value of each parameter to be optimized as a string of bits that is long enough to cover the range of possible values of the parameter, and to concatenate the strings for the individual parameters to obtain a genome that is a string of bits having some length L. In this system, each string of length L defines a particular solution to the optimization problem (i.e., a particular data point in the parametric space). Of course, task T500 may also be configured to use a data structure other than a string.

In one example, task T510 is configured to encode the value of smoothing degree p (e.g., in a range of from zero to fourteen) in four bits, values for each of the sharpening kernel gains $k_H$ and $k_V$ (e.g., in a range of from zero to 4.00) in seven bits, and values for each of sharpening threshold e1 and sharpening limit e2 (e.g., in a range of from zero to 100) in seven bits to obtain a five-parameter, 32-bit genome. Such a genome has over four billion possible values. For a case in which the parameter set also includes nine parameters from each sharpening kernel, it may be desirable to use a genome that is up to about sixty-two bits long.

Method M100 may be configured to begin with an initial population that is randomly generated (e.g., random strings of length n). In this case, for each genome in the population, task T300 performs the post-processing operation according to the parameter values encoded in the genome to generate a corresponding filtered representation, and task T400 evaluates the cost function for that filtered representation to determine the fitness of the genome.

Subsequent iterations of task T500 perform a reproduction stage to generate the population of the next generation. It may be desirable to configure task T500 to provide every genome with the chance to reproduce (e.g., to preserve diversity and/or to avoid local minima). It may be desirable to configure task T500 such that the probability that a genome will reproduce is based on the corresponding cost function value for a processed image generated according to that genome from a captured image. In one example, task T500 is configured to select parents for the next generation according to a roulette selection process, in which the probability of selecting a genome to be a parent is inversely proportional to the corresponding cost function value. In another example, task T500 is configured to select parents for the next generation according to a tournament selection process, such that from each set of two or more genomes or "contestants" that are randomly selected from the population, the genome having the lowest corresponding cost function value is selected to be a parent.

Task T500 may be configured to generate a genome of the new generation by performing a crossover operation (also called recombination), which generates a new genome from parts of two or more parents. The new solution may represent a large jump in the parametric space. A crossover operation may be performed by switching from one parent genome to the other at a single point, which may be randomly selected. Alternatively, a crossover operation may be performed by switching from one parent genome to another at multiple points, which may also be randomly selected.

Alternatively or additionally, task T500 may be configured to generate a genome of the new generation by performing a mutation operation, which generates a new genome by flipping a random bit in the parent genome. Such mutation represents a small random walk in the parametric space. In another example of mutation, the substring that encodes a value of a parameter (also called an "allele") is replaced by the value of a random variable (e.g., a uniformly distributed variable, a normally distributed (Gaussian) variable, etc.). A further example of mutation generates a new genome by flipping more than one random bit in the parent genome, or by inverting a randomly selected substring of the genome (also called "inversion").

Task T500 may be configured to perform a random mix of crossover and mutation operations. Task T500 may also be configured to identify the one or more best genomes of a generation (e.g., the genomes having the lowest cost function values) and pass them unaltered to the next generation. Such a process is also known as "elitism". In one example, task T500 is configured to generate the next generation with an eighty-percent probability of crossover and a probability of mutation that is less than ten percent. In such case, elitism may be used to select the remaining population.

In one particular example, method M100 is configured to generate and evaluate a population of one hundred genomes for each of one hundred generations, and to return the set of parameter values that are encoded in the genome associated with the lowest corresponding cost function value. Such an example of method M100 may also be configured to terminate early if a genome associated with a cost function value below a given threshold value is encountered. It will be understood that a genetic algorithm implementation of method M100 may be used to obtain a commercially acceptable or even superior result by sampling a very small fraction (much less than one percent, one-tenth of one percent, or even one-hundredth of one percent) of the parametric space.

Tasks T200, T300, T400, and T500 may be performed by an apparatus that includes at least one processor and storage, such as a desktop computer or a network of computers. Instances of post-processing task T300 and evaluation task T400 may be performed for each genome of a generation in parallel, without requiring communication with a processing path for any other genome of that generation. Consequently, multiple instances of each task may be implemented on a multi-core processor, such as a graphics processing unit (GPU). One example of such a processor is the GTX 200 GPU (Nvidia Corporation, Santa Clara, Calif.), which includes 240 stream processors. One example of an assembly that includes such a processor is the Nvidia GeForce GTX 280 graphics expansion card. A card having such a processor may be used to evaluate an entire generation at once. Multiple instances of such tasks may also be executed on a card having more than one multi-core GPU and/or on multiple multi-core processor cards (e.g., connected via a Scalable Link Interface (SLI) bridge). Additionally, multi-core processors and/or cards having such a processor may be stacked to process consecutive generations.

The sharpness of an image that is captured by an end-user of a camera may be related to the illumination conditions under which the image is taken. Outdoor scenes, for example, tend to be more brightly lit as well as more directly lit, and images taken under such conditions tend to have higher sharpness. Indoor scenes, on the other hand, tend to be more dimly lit as well as more diffusely lit, and images taken under such conditions tend to have edges that are less sharp. It may be desirable to perform multiple instances of method M110 or M112 (possibly in parallel) to generate different sets of parameter values for post-processing of images captured under different illumination conditions. For example, a set of captured images that were captured under dim illumination may be used to generate a set of parameter values optimized for post-processing of images captured under dim illumination, and a set of captured images that were captured under bright illumination may be used to generate a set of parameter values for post-processing of images captured under bright illumination. In a further example, sets of images taken under three different illumination levels are used to generate three different corresponding sets of parameter values for post-processing.

The principles described above may be used to implement an automated camera tuning process that has a reduced learning curve and can be used to obtain consistent and commercial-quality results without the need for a trained expert's subjective evaluation. Such a process may enable a relatively unskilled human operator to tune a camera by obtaining the captured images and initiating the automated tuning process (e.g., by indicating a file directory or other location in which the captured images are stored). In a further example, the task of obtaining the captured images may also be automated. It is noted that method M110 may include performing one or more other processing operation on the captured images between tasks T110 and T310 and/or between tasks T310 and T410 (e.g., image compression and decompression, color correction and/or conversion, and/or one or more other spatial and/or frequency-domain processing operations, such as automatic white balance).

FIG. 24A shows a block diagram of an apparatus MF100 according to a general configuration. Apparatus MF100 includes means F100 for obtaining a captured representation of a reference pattern. Means F100 may be configured to perform a capturing operation (e.g., as described above with reference to various implementations of task T100) to obtain the captured representation. Alternatively, means F100 may be configured to receive the captured representation from another device or to retrieve the captured representation from storage (e.g., a computer-readable volatile or nonvolatile storage medium, such as a memory module or disk). Apparatus MF100 includes means F200 for obtaining a pattern for matching (e.g., as described above with reference to various implementations of task T200). Apparatus MF100 includes means F300 for performing a filtering operation on the captured representation (e.g., as described above with reference to various implementations of task T300). Apparatus MF100 includes means F400 for evaluating the filtered representation (e.g., as described above with reference to various implementations of task T400). Apparatus MF100 includes means F500 for modifying at least one parameter value of the filtering operation (e.g., as described above with reference to various implementations of task T500). In one example, each of one or more (possibly all) of means F100, F200, F300, F400, and F500 is implemented in whole or part as a set of instructions executable by one or more processors. In another example, each of one or more (possibly all) of means F100, F200, F300, F400, and F500 is implemented in whole or part in hardware (e.g., in an application-specific integrated circuit (ASIC) or field-programmable gate array (FPGA)).

FIG. 24B shows a block diagram of an apparatus A100 according to a general configuration. Apparatus A100 includes a sensor 100 configured to capture a representation of a reference pattern (e.g., as described above with reference to various implementations of task T100). Apparatus A100 includes a pattern generator 200 configured to obtain a pattern for matching (e.g., as described above with reference to various implementations of task T200). Apparatus A100 includes a filter 300 configured to perform a filtering operation on the captured representation (e.g., as described above with reference to various implementations of task T300). Apparatus MF100 includes a calculator 400 configured to evaluate the filtered representation (e.g., as described above with reference to various implementations of task T400). Apparatus A100 includes an optimizer 500 configured to modify at least one parameter value of the filtering operation (e.g., as described above with reference to various implementations of task T500). In one example, each of one or more (possibly all) of elements 200, 300, 400, and 500 is implemented in whole or part as a set of instructions executable by one or more processors. In another example, each of one or more (possibly all) of elements 200, 300, 400, and 500 is implemented in whole or part in hardware (e.g., in an application-specific integrated circuit (ASIC) or field-programmable gate array (FPGA)).

FIG. 25A shows a block diagram of an implementation F202 of means F200 for obtaining a pattern for matching that includes means F210 for determining feature locations, means F220 for calculating characterization of location transfer error, and means F230 for applying the characterization of location transfer error. Means F210 is configured to determine, for each of a plurality of features of the reference pattern, a location of the feature within the captured representation (e.g., as described above with reference to various implementations of task T2010). Means F220 is configured to calculate a characterization of location transfer error based on the determined locations of the plurality of features in the captured representation (e.g., as described above with reference to various implementations of task T2010). Means F230 is configured to apply the characterization of location transfer error to the reference pattern to obtain a spatially modified reference pattern (e.g., as described above with reference to various implementations of task T2020).

FIG. 25B shows a block diagram of an implementation MF102 of apparatus MF100 that includes means F600 for performing at least one further iteration of a sequence of performing a filtering operation, evaluating, and modifying. Means F600 is configured to control means F300, means F400, and means F500 to perform at least one further iteration of a sequence of performing a filtering operation, evaluating, and modifying (e.g., as described herein with reference to implementations of method M100) such that the modified parameter values from each iteration are used to produce the filtered representation for the next iteration.

Figure 26B:
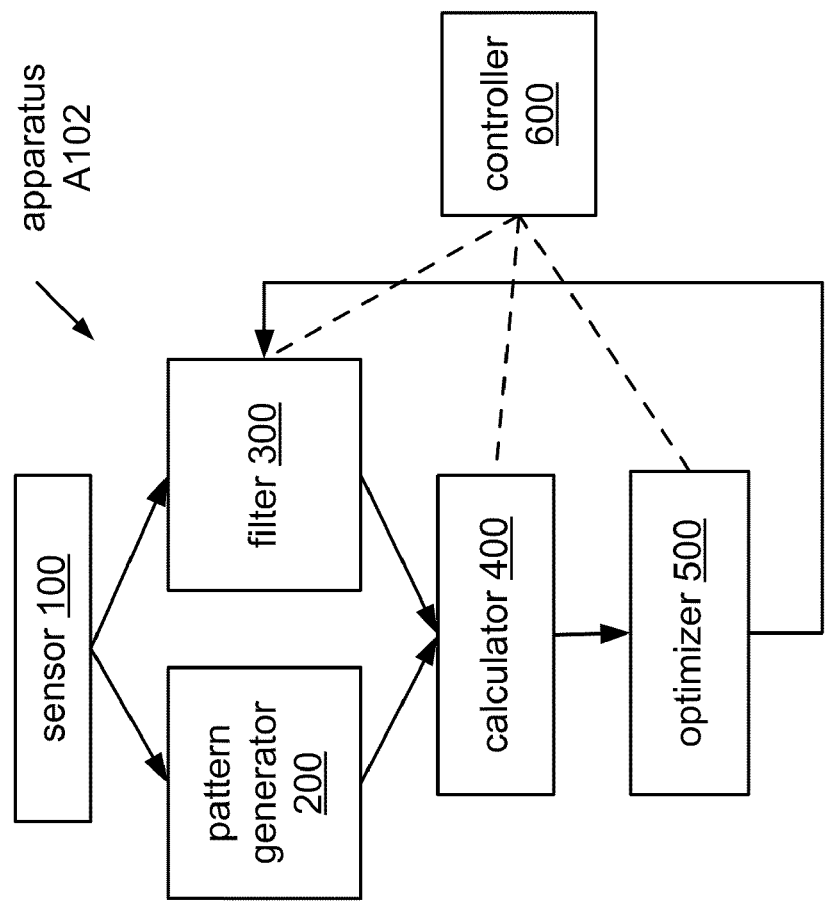
FIG. 26B shows a block diagram of an implementation A102 of apparatus A100.
Figure 26A:
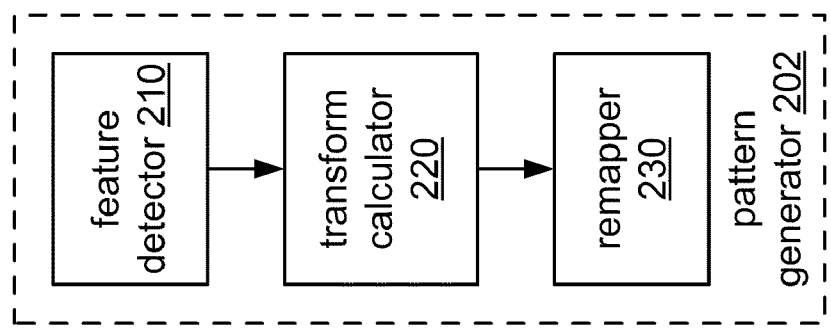
FIG. 26A shows a block diagram of an implementation 202 of pattern generator 200.

FIG. 26A shows a block diagram of an implementation 202 of pattern generator 200 that includes a feature detector 210, a transform calculator 220, and a remapper 230. Feature detector 210 is configured to determine, for each of a plurality of features of the reference pattern, a location of the feature within the captured representation (e.g., as described above with reference to various implementations of task T2010). Transform calculator 220 is configured to calculate a characterization of location transfer error based on the determined locations of the plurality of features in the captured representation (e.g., as described above with reference to various implementations of task T2010). Remapper 230 is configured to apply the characterization of location transfer error to the reference pattern to obtain a spatially modified reference pattern (e.g., as described above with reference to various implementations of task T2020).

FIG. 26B shows a block diagram of an implementation A102 of apparatus A100 that includes a controller 600. Controller 600 is configured to control filter 300, calculator 400, and optimizer 500 to perform at least one further iteration of a sequence of performing a filtering operation, evaluating, and modifying (e.g., as described herein with reference to implementations of method M100) such that the modified parameter values from each iteration are used to produce the filtered representation for the next iteration.

Figure 27C:
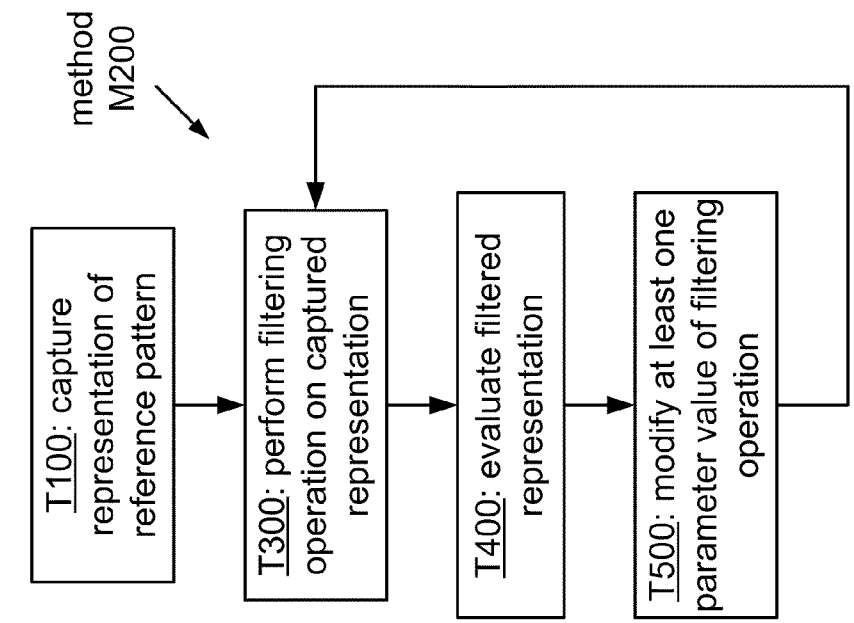
FIG. 27C shows a flowchart of a method M200 according to a general configuration.
Figure 27A:
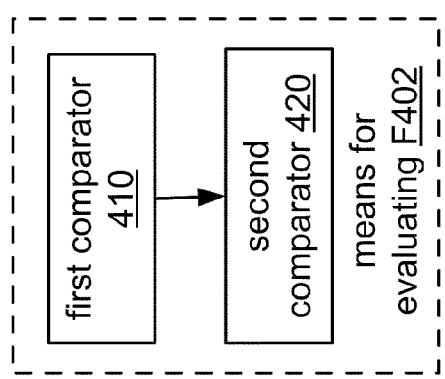
FIG. 27A shows a block diagram of an implementation F402 of means 400.

FIG. 27A shows a block diagram of an implementation F402 of means 400 for evaluating that includes means F410 for determining overshoot pixel values and means F420 for distinguishing among overshoot pixel values. Means F410 is configured to determine that a plurality of pixel values of a sharpened image are overshoot pixel values, and means F420 is configured to distinguish at least two categories among the plurality of overshoot pixel values (e.g., as described herein with reference to implementations of task T410).

Figure 27B:
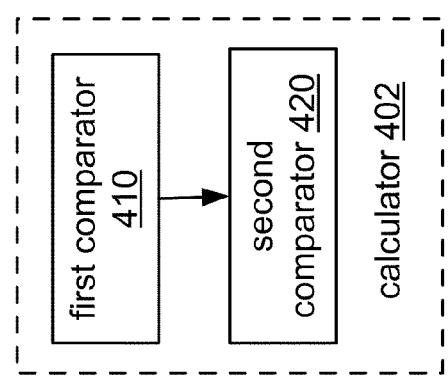
FIG. 27B shows a block diagram of an implementation 402 of calculator 400.

FIG. 27B shows a block diagram of an implementation 402 of calculator 400 that includes a first comparator 410 and a second comparator 420. First comparator 410 is configured to determine that a plurality of pixel values of a sharpened image are overshoot pixel values, and second comparator 420 is configured to distinguish at least two categories among the plurality of overshoot pixel values (e.g., as described herein with reference to implementations of task T410).

FIG. 27C shows a flowchart of a method M200 according to a general configuration. Method M200 includes instances of tasks T100, T300, T400, and T500 as described herein. In this case, task T200 may be omitted, and task T400 may be configured to evaluate one or more qualities of the filtered representation without reference to a pattern for matching (e.g., as described above with reference to evaluation of noise and sharpness measures).

The foregoing presentation of the described configurations is provided to enable any person skilled in the art to make or use the methods and other structures disclosed herein. The flowcharts, block diagrams, state diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various elements of an implementation of an apparatus as disclosed herein (e.g., apparatus MF100, as well as the numerous implementations of such apparatus and additional apparatus that are expressly disclosed herein by virtue of the descriptions of the various implementations of methods as disclosed herein) may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors.

Those of skill will appreciate that the various illustrative modules, logical blocks, circuits, and operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., methods M100, M102, M110, and M112) may be performed by a array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A non-transitory computer-readable medium having tangible features that store machine-readable instructions which when executed by at least one processor cause the at least one processor to:
   obtain a captured representation of a reference pattern;
   based on the captured representation, obtain a pattern for matching;
   perform a filtering operation that is based on a set of values for the plurality of filter parameters, including performing said filtering operation on the captured representation to produce a filtered representation;
   evaluate at least one difference between the filtered representation and the pattern for matching; based on a result of said evaluating, modify at least one among the set of values; and
   perform at least one further iteration of a sequence of said performing a filtering operation, said evaluating, and said modifying such that: said set of values in each further iteration of said performing a filtering operation is the set of values as modified in the previous iteration of the sequence, and said filtered representation in each iteration of said evaluating is the filtered representation produced in the current iteration of the sequence, and said result in each iteration of said modifying is the result of said evaluating in the current iteration of the sequence.

2. The method according to claim 1, wherein said performing a filtering operation includes sharpening edges within the captured representation to produce the filtered representation.

3. The method according to claim 2, wherein said sharpening edges within the captured representation includes applying a convolution mask to an image that is based on the captured representation, and
   wherein at least one iteration of said modifying at least one value includes modifying at least one value of the convolution mask.

4. The method according to claim 1, wherein said evaluating at least one difference between the filtered representation and the pattern for matching includes evaluating a difference between (A) sharpness of edges within the filtered representation and (B) sharpness of edges within the pattern for matching.

5. The method according to claim 1, wherein said method comprises evaluating a measure of oversharpening of edges within the filtered representation, and wherein said modifying at least one among the set of values is based on said evaluated measure of oversharpening.

6. The method according to claim 1, wherein said modifying at least one among the set of values includes executing a genetic algorithm to produce a modified set of values.

7. The method according to claim 1, wherein said obtaining a pattern for matching comprises calculating the pattern for matching by combining intensity transfer error information from the captured representation with transition location information from the reference pattern.

8. The method according to claim 1, wherein said method comprises:
   obtaining a second captured representation of a second reference pattern, wherein the second reference pattern is different than the first reference pattern; and
   based on the second captured representation, obtaining a second pattern for matching,
   wherein each iteration of said performing a filtering operation includes performing said filtering operation on the second captured representation to produce a second filtered representation, and
   wherein each iteration of the sequence comprises evaluating at least one difference between the second filtered representation produced in the current iteration and the second pattern for matching, and
   wherein each iteration of said modifying is based on a result of said evaluating at least one difference between the second filtered representation and the second pattern for matching in the current iteration of the sequence.

9. A computer-readable medium having tangible features that store machine-readable instructions which when executed by at least one processor cause the at least one processor to:
   obtain a captured representation of a reference pattern;
   based on the captured representation, obtain a pattern for matching;
   perform a filtering operation that is based on a set of values for the plurality of filter parameters, including performing said filtering operation on the captured representation to produce a filtered representation;
   evaluate at least one difference between the filtered representation and the pattern for matching;
   based on a result of said evaluating, modify at least one among the set of values; and
   perform at least one further iteration of a sequence of said performing a filtering operation, said evaluating, and said modifying such that:
   said set of values in each further iteration of said performing a filtering operation is the set of values as modified in the previous iteration of the sequence, and
   said filtered representation in each iteration of said evaluating is the filtered representation produced in the current iteration of the sequence, and
   said result in each iteration of said modifying is the result of said evaluating in the current iteration of the sequence.

10. An apparatus for producing an optimized set of values for a plurality of filter parameters, said apparatus comprising:

means for obtaining a captured representation of a reference pattern;

means for obtaining a pattern for matching based on the captured representation;

means for performing a filtering operation that is based on a set of values for the plurality of filter parameters, including performing said filtering operation on the captured representation to produce a filtered representation;

means for evaluating at least one difference between the filtered representation and the pattern for matching;

means for modifying at least one among the set of values, based on a result of said evaluating; and means for performing at least one further iteration of a sequence of said performing a filtering operation, said evaluating, and said modifying such that:

said set of values in each further iteration of said performing a filtering operation is the set of values as modified in the previous iteration of the sequence, and said filtered representation in each iteration of said evaluating is the filtered representation produced in the current iteration of the sequence, and said result in each iteration of said modifying is the result of said evaluating in the current iteration of the sequence.

11. The apparatus according to claim 10, wherein said means for performing a filtering operation includes means for sharpening edges within the captured representation to produce the filtered representation.

12. The apparatus according to claim 11, wherein said means for sharpening edges within the captured representation includes applying a convolution mask to an image that is based on the captured representation, and wherein at least one iteration of said modifying at least one value includes modifying at least one value of the convolution mask.

13. The apparatus according to claim 10, wherein said means for evaluating at least one difference between the filtered representation and the pattern for matching includes means for evaluating a difference between (A) sharpness of edges within the filtered representation and (B) sharpness of edges within the pattern for matching.

14. The apparatus according to claim 10, wherein said apparatus comprises means for evaluating a measure of oversharpening of edges within the filtered representation, and wherein said modifying at least one among the set of values is based on said evaluated measure of oversharpening.

15. The apparatus according to claim 10, wherein said means for modifying at least one among the set of values includes means for executing a genetic algorithm to produce a modified set of values.

16. The apparatus according to claim 10, wherein said means for obtaining a pattern for matching comprises means for calculating the pattern for matching by combining intensity transfer error information from the captured representation with transition location information from the reference pattern.

17. The apparatus according to claim 10, wherein said apparatus comprises:

means for obtaining a second captured representation of a second reference pattern, wherein the second reference pattern is different than the first reference pattern; and means for obtaining a second pattern for matching, based on the second captured representation, wherein each iteration of said performing a filtering operation includes performing said filtering operation on the second captured representation to produce a second filtered representation, and wherein each iteration of the sequence comprises evaluating at least one difference between the second filtered representation produced in the current iteration and the second pattern for matching, and wherein each iteration of said modifying is based on a result of said evaluating at least one difference between the second filtered representation and the second pattern for matching in the current iteration of the sequence.

18. An apparatus for producing an optimized set of values for a plurality of filter parameters, said apparatus comprising:

a sensor configured to capture a representation of a reference pattern;

a pattern generator configured to obtain a pattern for matching based on the captured representation;

a filter configured to perform a filtering operation that is based on a set of values for the plurality of filter parameters, wherein said filter is arranged to perform said filtering operation on the captured representation to produce a filtered representation;

a calculator configured to evaluate at least one difference between the filtered representation and the pattern for matching;

an optimizer configured to modify at least one among the set of values, based on a result of said evaluating; and a controller configured to control said filter, said calculator, and said optimizer to perform at least one further iteration of a sequence of said performing a filtering operation, said evaluating, and said modifying such that:

said set of values in each further iteration of said performing a filtering operation is the set of values as modified in the previous iteration of the sequence, and said filtered representation in each iteration of said evaluating is the filtered representation produced in the current iteration of the sequence, and said result in each iteration of said modifying is the result of said evaluating in the current iteration of the sequence.

19. The apparatus according to claim 18, wherein said filter is configured to sharpen edges within the captured representation to produce the filtered representation.

20. The apparatus according to claim 19, wherein said filter is configured to apply a convolution mask to an image that is based on the captured representation, and wherein at least one iteration of said modifying at least one value includes modifying at least one value of the convolution mask.

21. The apparatus according to claim 18, wherein said calculator is configured to evaluate a difference between (A) sharpness of edges within the filtered representation and (B) sharpness of edges within the pattern for matching.

22. The apparatus according to claim 18, wherein said apparatus comprises a second calculator configured to evaluate a measure of oversharpening of edges within the filtered representation, and wherein said modifying at least one among the set of values is based on said evaluated measure of oversharpening.

23. The apparatus according to claim 18, wherein said optimizer is configured to execute a genetic algorithm to produce a modified set of values.

24. The apparatus according to claim 18, wherein said pattern generator is configured to calculate the pattern for matching by combining intensity transfer error information from the captured representation with transition location information from the reference pattern.

25. The apparatus according to claim 18, wherein said sensor is configured to obtain a second captured representation of a second reference pattern, wherein the second reference pattern is different than the first reference pattern, and wherein said pattern generator is configured to obtain a second pattern for matching, based on the second captured representation, and wherein each iteration of said performing a filtering operation includes performing said filtering operation on the second captured representation to produce a second filtered representation, and wherein each iteration of the sequence comprises evaluating at least one difference between the second filtered representation produced in the current iteration and the second pattern for matching, and wherein each iteration of said modifying is based on a result of said evaluating at least one difference between the second filtered representation and the second pattern for matching in the current iteration of the sequence.

26. A method of processing captured images, said method comprising:

for each of a plurality of reference patterns, capturing an image of the reference pattern;

for each of the plurality of captured images, performing a filtering operation on the captured image to obtain a filtered image;

for each of the plurality of filtered images, evaluating a quality of the image; and based on the plurality of evaluated qualities, modifying the filtering operation, wherein at least one among the plurality of reference patterns includes a plurality of regions of substantially uniform intensity that meet to form a plurality of high-contrast edges, and wherein, for each of the plurality of high-contrast edges, an intensity difference across the edge is at least equal to a first value, and wherein at least one among the plurality of reference patterns includes a plurality of regions of substantially uniform intensity that meet to form a plurality of low-contrast edges, and wherein, for each of the plurality of low-contrast edges, an intensity difference across the edge is not greater than seventy-five percent of the first value, and wherein, in at least one among the plurality of the captured images, among a plurality of edges that correspond to the plurality of low-contrast edges, adjacent edges are separated by at least eight pixels.

27. The method according to claim 26, wherein at least one among (A) the plurality of low-contrast edges and (B) the plurality of high-contrast edges forms a plurality of concentric figures.

28. The method according to claim 26, wherein the plurality of reference patterns includes a plurality of curved edges having different respective curvatures.

29. The method according to claim 26, wherein the plurality of reference patterns includes a plurality of straight edges in a first direction, a plurality of straight edges in a second direction orthogonal to the first direction, and a plurality of straight edges in a third direction that differs from each of the first and second directions by at least twenty-five degrees.

30. The method according to claim 26, wherein the difference between (A) the minimum intensity among the plurality of regions of substantially uniform intensity that meet to form a plurality of low-contrast edges and (B) the minimum intensity among the plurality of regions of substantially uniform intensity that meet to form a plurality of high-contrast edges is at least twenty-five percent of the difference between the minimum and maximum intensities among the plurality of regions of substantially uniform intensity that meet to form a plurality of high-contrast edges, and wherein the difference between (A) the maximum intensity among the plurality of regions of substantially uniform intensity that meet to form a plurality of low-contrast edges and (B) the maximum intensity among the plurality of regions of substantially uniform intensity that meet to form a plurality of high-contrast edges is at least twenty-five percent of the difference between the minimum and maximum intensities among the plurality of regions of substantially uniform intensity that meet to form a plurality of high-contrast edges.

31. The method according to claim 26, wherein said evaluating a quality of the image includes evaluating an oversharpening measure for the image.

32. The method according to claim 26, wherein a first one among the plurality of reference patterns includes:

a first set of four markers that are arranged at respective vertices of a quadrilateral and have a first color; and a second set of four markers, separate from the first set, that are arranged at respective vertices of a different quadrilateral and have a second color different than the first color.

33. The method according to claim 32, wherein said method comprises:

for each among the first and second sets of four markers, determining a location of the marker within a first one among the plurality of captured images;

based on the determined locations of the markers in said first captured image, calculating a spatial transformation;

applying the spatial transformation to said first reference pattern to obtain a spatially modified reference pattern;

based on the locations of a plurality of edges within the spatially modified reference pattern, calculating a pattern for matching; and evaluating at least one difference between the pattern for matching and one among the plurality of filtered images that corresponds to said first captured image.

34. The method according to claim 33, wherein said evaluating at least one difference includes evaluating a difference between (A) sharpness of edges within said one among the plurality of filtered images that corresponds to said first captured image and (B) sharpness of edges within the pattern for matching.

35. A non-transitory computer-readable medium having tangible features that store machine-readable instructions which when executed by at least one processor cause the at least one processor to:

for each of a plurality of reference patterns, obtain a captured image of the reference pattern;

for each of the plurality of captured images, perform a filtering operation on the captured image to obtain a filtered image;

for each of the plurality of filtered images, evaluate a quality of the image; and based on the plurality of evaluated qualities, modify the filtering operation, wherein at least one among the plurality of reference patterns includes a plurality of regions of substantially uniform intensity that meet to form a plurality of high-contrast edges, and wherein, for each of the plurality of high-contrast edges, an intensity difference across the edge is at least equal to a first value, and wherein at least one among the plurality of reference patterns includes a plurality of regions of substantially uniform intensity that meet to form a plurality of low-contrast edges, and wherein, for each of the plurality of low-contrast edges, an intensity difference across the edge is not greater than seventy-five percent of the first value, and wherein, in at least one among the plurality of the captured images, among a plurality of edges that correspond to the plurality of low-contrast edges, adjacent edges are separated by at least eight pixels.

36. An apparatus for processing captured images, said apparatus comprising:
    means for obtaining, for each of a plurality of reference patterns, a captured image of the reference pattern;
    means for performing, for each of the plurality of captured images, a filtering operation on the captured image to obtain a filtered image;
    means for evaluating, for each of the plurality of filtered images, a quality of the image; and
    means for modifying the filtering operation, based on the plurality of evaluated qualities,
    wherein at least one among the plurality of reference patterns includes a plurality of regions of substantially uniform intensity that meet to form a plurality of high-contrast edges, and
    wherein, for each of the plurality of high-contrast edges, an intensity difference across the edge is at least equal to a first value, and
    wherein at least one among the plurality of reference patterns includes a plurality of regions of substantially uniform intensity that meet to form a plurality of low-contrast edges, and
    wherein, for each of the plurality of low-contrast edges, an intensity difference across the edge is not greater than seventy-five percent of the first value, and
    wherein, in at least one among the plurality of the captured images, among a plurality of edges that correspond to the plurality of low-contrast edges, adjacent edges are separated by at least eight pixels.

37. The apparatus according to claim 36, wherein at least one among (A) the plurality of low-contrast edges and (B) the plurality of high-contrast edges forms a plurality of concentric figures.

38. The apparatus according to claim 36, wherein the plurality of reference patterns includes a plurality of curved edges having different respective curvatures.

39. The apparatus according to claim 36, wherein the plurality of reference patterns includes a plurality of straight edges in a first direction, a plurality of straight edges in a second direction orthogonal to the first direction, and a plurality of straight edges in a third direction that differs from each of the first and second directions by at least twenty-five degrees.

40. The apparatus according to claim 36, wherein the difference between (A) the minimum intensity among the plurality of regions of substantially uniform intensity that meet to form a plurality of low-contrast edges and (B) the minimum intensity among the plurality of regions of substantially uniform intensity that meet to form a plurality of high-contrast edges is at least twenty-five percent of the difference between the minimum and maximum intensities among the plurality of regions of substantially uniform intensity that meet to form a plurality of high-contrast edges, and
    wherein the difference between (A) the maximum intensity among the plurality of regions of substantially uniform intensity that meet to form a plurality of low-contrast edges and (B) the maximum intensity among the plurality of regions of substantially uniform intensity that meet to form a plurality of high-contrast edges is at least twenty-five percent of the difference between the minimum and maximum intensities among the plurality of regions of substantially uniform intensity that meet to form a plurality of high-contrast edges.

41. The apparatus according to claim 36, wherein said means for evaluating a quality of the image includes means for evaluating an oversharpening measure for the image.

42. The apparatus according to claim 36, wherein a first one among the plurality of reference patterns includes:
    a first set of four markers that are arranged at respective vertices of a quadrilateral and have a first color; and
    a second set of four markers, separate from the first set, that are arranged at respective vertices of a different quadrilateral and have a second color different than the first color.

43. The apparatus according to claim 42, wherein said apparatus comprises:
    means for determining, for each among the first and second sets of four markers, a location of the marker within a first one among the plurality of captured images;
    means for calculating a spatial transformation, based on the determined locations of the markers in said first captured image;
    means for applying the spatial transformation to said first reference pattern to obtain a spatially modified reference pattern;
    means for calculating a pattern for matching based on the locations of a plurality of edges within the spatially modified reference pattern; and
    means for evaluating at least one difference between the pattern for matching and one among the plurality of filtered images that corresponds to said first captured image.

44. The apparatus according to claim 43, wherein said means for evaluating at least one difference includes means for evaluating a difference between (A) sharpness of edges within said one among the plurality of filtered images that corresponds to said first captured image and (B) sharpness of edges within the pattern for matching.

45. An apparatus for processing captured images, said apparatus comprising:
    an imaging sensor configured to capture, for each of a plurality of reference patterns, an image of the reference pattern;
    a filter configured to perform, for each of the plurality of captured images, a filtering operation on the captured image to obtain a filtered image;
    a calculator configured to evaluate, for each of the plurality of filtered images, a quality of the image; and
    an optimizer configured to modify the filtering operation, based on the plurality of evaluated qualities,
    wherein at least one among the plurality of reference patterns includes a plurality of regions of substantially uniform intensity that meet to form a plurality of high-contrast edges, and
    wherein, for each of the plurality of high-contrast edges, an intensity difference across the edge is at least equal to a first value, and
    wherein at least one among the plurality of reference patterns includes a plurality of regions of substantially uniform intensity that meet to form a plurality of low-contrast edges, and
    wherein, for each of the plurality of low-contrast edges, an intensity difference across the edge is not greater than seventy-five percent of the first value, and
    wherein, in at least one among the plurality of the captured images, among a plurality of edges that correspond to the plurality of low-contrast edges, adjacent edges are separated by at least eight pixels.

46. The apparatus according to claim 45, wherein at least one among (A) the plurality of low-contrast edges and (B) the plurality of high-contrast edges forms a plurality of concentric figures.

47. The apparatus according to claim 45, wherein the plurality of reference patterns includes a plurality of curved edges having different respective curvatures.

48. The apparatus according to claim 45, wherein the plurality of reference patterns includes a plurality of straight edges in a first direction, a plurality of straight edges in a second direction orthogonal to the first direction, and a plurality of straight edges in a third direction that differs from each of the first and second directions by at least twenty-five degrees.

49. The apparatus according to claim 45, wherein the difference between (A) the minimum intensity among the plurality of regions of substantially uniform intensity that meet to form a plurality of low-contrast edges and (B) the minimum intensity among the plurality of regions of substantially uniform intensity that meet to form a plurality of high-contrast edges is at least twenty-five percent of the difference between the minimum and maximum intensities among the plurality of regions of substantially uniform intensity that meet to form a plurality of high-contrast edges, and wherein the difference between (A) the maximum intensity among the plurality of regions of substantially uniform intensity that meet to form a plurality of low-contrast edges and (B) the maximum intensity among the plurality of regions of substantially uniform intensity that meet to form a plurality of high-contrast edges is at least twenty-five percent of the difference between the minimum and maximum intensities among the plurality of regions of substantially uniform intensity that meet to form a plurality of high-contrast edges.

50. The apparatus according to claim 45, wherein said calculator is configured to evaluate an oversharpening measure for the image.

51. The apparatus according to claim 45, wherein a first one among the plurality of reference patterns includes:
a first set of four markers that are arranged at respective vertices of a quadrilateral and have a first color; and
a second set of four markers, separate from the first set, that are arranged at respective vertices of a different quadrilateral and have a second color different than the first color.

52. The apparatus according to claim 51, wherein said apparatus comprises:
a feature detector configured to detect, for each among the first and second sets of four markers, a location of the marker within a first one among the plurality of captured images;
a transform calculator configured to calculate a spatial transformation, based on the determined locations of the markers in said first captured image;
a remapper configured to apply the spatial transformation to said first reference pattern to obtain a spatially modified reference pattern;
a pattern generator configured to calculate a pattern for matching based on the locations of a plurality of edges within the spatially modified reference pattern, and
wherein said calculator is configured to evaluate at least one difference between the pattern for matching and one among the plurality of filtered images that corresponds to said first captured image.

53. The apparatus according to claim 52, wherein said calculator is configured to evaluate a difference between (A) sharpness of edges within said one among the plurality of filtered images that corresponds to said first captured image and (B) sharpness of edges within the pattern for matching.

* * * * *